(12) United States Patent
Wolf et al.

(10) Patent No.: US 10,296,815 B2
(45) Date of Patent: May 21, 2019

(54) CASCADED CONVOLUTIONAL NEURAL NETWORK

(71) Applicant: Ramot at Tel Aviv University Ltd., Tel Aviv (IL)

(72) Inventors: Lior Wolf, Herzliya (IL); Assaf Mushinsky, Tel Aviv (IL)

(73) Assignee: Ramot at Tel Aviv University Ltd., Tel Aviv (IL)

( * ) Notice: Subject to any disclaimer, the term of this patent is extended or adjusted under 35 U.S.C. 154(b) by 0 days.

(21) Appl. No.: 15/749,693

(22) PCT Filed: Apr. 20, 2017

(86) PCT No.: PCT/IL2017/050461
§ 371 (c)(1),
(2) Date: Feb. 1, 2018

(87) PCT Pub. No.: WO2017/183034
PCT Pub. Date: Oct. 26, 2017

(65) Prior Publication Data
US 2019/0042892 A1     Feb. 7, 2019

Related U.S. Application Data

(60) Provisional application No. 62/486,997, filed on Apr. 19, 2017, provisional application No. 62/325,562, (Continued)

(30) Foreign Application Priority Data

Aug. 16, 2016 (GB) .................................... 1614009.7

(51) Int. Cl.
*G06K 9/62* (2006.01)
*G06K 9/00* (2006.01)
(Continued)

(52) U.S. Cl.
CPC ....... *G06K 9/6274* (2013.01); *G06K 9/00228* (2013.01); *G06K 9/46* (2013.01);
(Continued)

(58) Field of Classification Search
CPC ............. G06K 9/6274; G06K 9/00228; G06K 9/4628; G06K 9/6202; G06K 9/66; G06T 7/70; G06T 2207/20084; G06N 3/0454
(Continued)

(56) References Cited

U.S. PATENT DOCUMENTS 6,944,342 B1   9/2005   Stahl et al.
7,054,850 B2   5/2006   Matsugu
(Continued)

FOREIGN PATENT DOCUMENTS

WO    2015154206 A1    10/2015
WO    2015169102 A1    11/2015
WO    WO-2015196102 A1 * 12/2015 ....... G06F 17/30256

OTHER PUBLICATIONS

Cai, Zhaowei et al., "Learning Complexity-Aware Cascades for Deep Pedestrian Detection", Proceedings of the IEEE International Conference on Computer Vision, 3361-3369 , Jul. 19, 2015, pp. 1-9 (9 Pages).
(Continued)

*Primary Examiner* — Jonathan S Lee
(74) *Attorney, Agent, or Firm* — Brown Rudnick LLP

(57) ABSTRACT

A convolutional neural network system for detecting at least one object in at least one image. The system includes a plurality of object detectors, corresponding to a predetermined image window size in the at least one image. Each object detector is associated with a respective down-sampling ratio with respect to the at least one image. Each object detector includes a respective convolutional neural network and an object classifier coupled with the convolutional
(Continued)

neural network. The respective convolutional neural network includes a plurality of convolution layers. The object classifier classifies objects in the image according to the results from the convolutional neural network. Object detectors associated with the same respective down-sampling ratio define at least one group of object detectors. Object detectors in a group of object detectors being associated with common convolution layers.

15 Claims, 14 Drawing Sheets

Related U.S. Application Data filed on Apr. 21, 2016, provisional application No. 62/325,551, filed on Apr. 21, 2016, provisional application No. 62/325,553, filed on Apr. 21, 2016.

(51) Int. Cl.
| G06K 9/46 | (2006.01) |
| G06K 9/66 | (2006.01) |
| G06N 3/04 | (2006.01) |
| G06N 5/04 | (2006.01) |
| G06T 7/70 | (2017.01) |

(52) U.S. Cl.
CPC ......... *G06K 9/4628* (2013.01); *G06K 9/6202* (2013.01); *G06K 9/6268* (2013.01); *G06K 9/6281* (2013.01); *G06K 9/66* (2013.01); *G06N 3/0454* (2013.01); *G06N 5/046* (2013.01); *G06T 7/70* (2017.01); *G06T 2207/20084* (2013.01)

(58) Field of Classification Search
USPC .......................................................... 382/103
See application file for complete search history.

(56) References Cited

U.S. PATENT DOCUMENTS

| 2002/0038294 | A1 | 3/2002 | Matsugu | |
| 2015/0278642 | A1 | 10/2015 | Chertok et al. | |
| 2015/0347820 | A1 | 12/2015 | Yin et al. | |
| 2016/0180195 | A1* | 6/2016 | Martinson | G06K 9/6256 382/103 |
| 2017/0357892 | A1* | 12/2017 | Lin | G06N 3/084 |

OTHER PUBLICATIONS

Chen, Dong et al., "Joint Cascade Face Detection and Alignment", Computer Vision ECCV 2014: 13th European Conference, Zurich, Switzerland, Sep. 6-12, 2014, Proceedings, Part VI <https://www.researchgate.net/publication/321570674_Computer_Vision_-_ECCV_2014_13th_European_Conference_Zurich_Switzerland_September_6-12_2014_Proceedings_Part_VI>, pp. 109-122 (14 Pages).
Chetlur, Sharan et al., "cuDNN: Efficient Primitives for Deep Learning", Oct. 3, 2014, pp. 1-9 (9 Pages).
Comaniciu, Dorin et al., "Mean Shift: A Robust Approach Towards Feature Space Analysis", IEE Transactions on Pattern Analysis and Machine Intelligence, vol. 24, No. 5, May 2002, pp. 603-619 (17 Pages).
Dollar, Piotr et al. "Fast Feature Pyramids for Object Detection", Submissions to IEEE Transactions on Pattern Analysis and Machine Intelligence, pp. 1-14 (14 Pages).
Dollar, Piotr et al., "Crosstalk Cascades for Frame-Rate Pedestrian Detection", Proceedings of the 12th European conference on Computer Vision—vol. Part II, pp. 645-659 (14 Pages).
Farfade, Sachin Sudhakar et al., "Multi-view Face Detection Using Deep Convolutional Neural Networks", International Conference on Multimedia Retrieval 2015 (ICMR), pp. 1-8 (8 Pages).
Felzenszwalb, Pedro F. et al., "Objection Detection With Discriminatively Trained Part Based Models", Department of Computer Science, PAMI 32(9), Sep. 1, 2010, pp. 1-20 (20 Pages).
Girshick, Ross "Fast R-CNN", ICCV '15 Proceedings of the 2015 IEEE International Conference on Computer Vision (ICCV), pp. 1440-1448 (9 Pages).
Girshick, Ross et al., "Rich Feature Hierarchies for Accurate Object Detection and Semantic Segmentation", CVPR '14 Proceedings of the 2014 IEEE Conference on Computer Vision and Pattern Recognition, pp. 1-21 (8 Pages).
Hasan, Kamrul et al., "Improving Alignment of Faces for Recognition", 2011 IEEE International Symposium on Robotic and Sensors Environments (ROSE) (6 Pages).
Huang, Lichau et al., "DenseBox: Unifying Landmark Localization with End to End Object Detection", Sep. 19, 2015, pp. 1-13 (13 Pages).
International Search Report and Written Opinion of the International Searching Authority dated Sep. 6, 2017, for International Application No. PCT/IL2017/050461 (14 Pages).
Jain, Vidit et al., "FDDB: A Benchmark for Face Detection in Unconstrained Settings", 2010, pp. 1-11 (11 Pages).
Kalinovskii, I.A. et al., "Compact Convolutional Neural Network Cascade for Face Detection", Parallel Computational Technologies (PCT'2016), pp. 1-10 (10 Pages).
Kostinger, Martin et al., "Annotated Facial Landmarks in the Wild: A Large-scale, Real-world Database for Facial Landmark Localization", 2011 IEEE International Conference on Computer Vision, Nov. 2011, pp. 2144-2151 (8 Pages).
Krizhevsky, Alex et al., "ImageNet Classification with Deep Convolutional Neural Networks", Advances in Neural Information Processing Systems 25 (NIPS 2012) <http://papers.nips.cc/book/advances-in-neural-information-processing-systems-25-2012>, pp. 1-9 (9 Pages).
Li, Haoxiang et al., "A Convolutional Neural Network Cascade for Face Detection", Stevens Institute of Technology, Hoboken NJ (10 Pages).
Li, Jianguo et al., "Learning SURF Cascade for Fast and Accurate Object Detection", Computer Vision Foundation, pp. 1-8 (8 Pages).
Mathias, Markus et al., "Face Detection Without Bells and Whistles", ESAT-PSI/VISICS, IMinds, KU Leven, Belgium, pp. 1-24 (24 Pages).
Quattoni, Ariadna et al., "Recognizing Indoor Scenes", A. Quattoni, and A.Torralba. Recognizing Indoor Scenes <http://people.csail.mit.edu/torralba/publications/indoor.pdf>. IEEE Conference on Computer Vision and Pattern Recognition (CVPR), 2009 (8 Pages).
Ranjan, Rajeev et al., "A Deep Pyramid Deformable Part Model for Face Detection", Center for Automatic Research, 2015 IEEE 7th International Conference on <http://ieeexplore.ieee.org/xpl/mostRecentIssue.jsp?punumber=7348870> Biometrics Theory, Applications and Systems (BTAS), pp. 1-9 (9 Pages).
Ren, Shaoqing et al., "Faster R-CNN: Towards Real-Time Object Detection with Region Proposal Networks", IEEE Transactions on Pattern Analysis and Machine Intelligence (TPAMI), vol. 39, Issue 6, 2017, pp. 1-14 (14 Pages).
Rowley, Henry A. et al., "Rotation Invariant Neural Network-Based Face Detection", School of Computer Science, Carnegie Mellon University, Pittsburgh, PA & Justsystem Pittsburgh Research Center, Pittsburgh, PA, pp. 1-7 (7 Pages).
Uijlings, J.R.R. et al., "Selective Search for Object Recognition", Technical Report 2012, submitted to IJCV, pp. 1-14 (14 Pages).
Vaillant R. et al., "Original Approach for the Localisation of Objects in Images", IEE Proc. Vis, Image Signal Process, vol. 141, No. 4, Aug. 1994, pp. 1-6 (6 Pages).
Viola, Paul et al., "Rapid Object Detection using a Boosted Cascade of Simple Features", Accepted Conference on Computer Vision and Pattern Recognition 2001, pp. 1-9 (9 Pages).
Xiong, Yuanjun et al., "Recognize Complex Events from Static Images by Fusing Deep Channels", 2015 IEEE Conference on

(56) References Cited

OTHER PUBLICATIONS

<http://ieeexplore.ieee.org/xpl/mostRecentIssue.jsp?punumber=7293313> Computer vision and Pattern Recognition, pp. 1600-1609 (10 Pages).
Yang, Bin et al., "Aggregate Channel Features for Multi-View Face Detection", Center for Biometrics and Security Research & National Laboratory of Pattern Recognition, Institute of Automation, Chinese Academy of Sciences, China, Sep. 2014, pp. 1-8 (8 Pages).
Yang, Bin et al., "Fine-grained Evaluation on Face Detection in the Wild", 2015 11th IEEE International Conference and Workshops on <http://ieeexplore.ieee.org/xpl/mostRecentIssue.jsp?punumber=7147635> Automatic Face and Gesture Recognition (FB) (7 Pages).
Yang, Shuo et al., "From Facial Parts Responses to Face Detection: A Deep Learning Approach", 2015 IEEE International Conference on <http://ieeexplore.ieee.org/xpl/mostRecentIssue.jsp?punumber=7407725> Computer vision (ICCV), pp. 1-9 (9 Pages).
Yang, Shuo et al., "Wider Face: A Face Detection Benchmark", Computer vision and Pattern Recognition (CVPR) (9 Pages).

\* cited by examiner

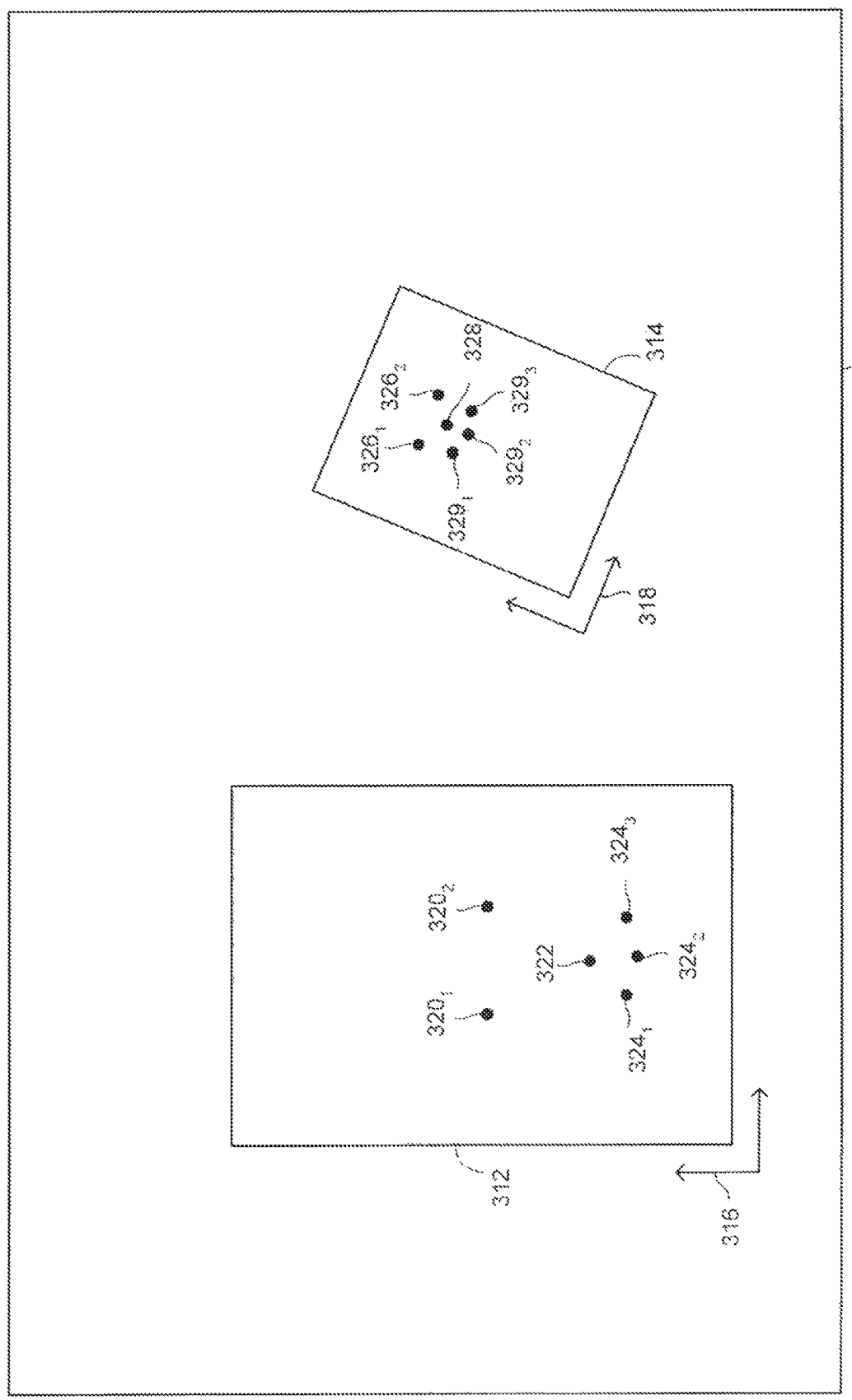

CASCADED CONVOLUTIONAL NEURAL NETWORK

FIELD OF THE DISCLOSED TECHNIQUE

The disclosed technique relates to neural networks in general, and to methods and systems for cascaded convolutional neural networks in particular.

BACKGROUND OF THE DISCLOSED TECHNIQUE

Convolutional Neural Networks (CNNs) are known in the art. Such networks are typically employed for object detection and classification in images. A Convolutional Neural Network (CNN) is typically constructed of one of more layers. At each layer, an operation is performed. Typically, this operation is one of a convolution operations and multiplication by an activation function. This operation may further include pooling also referred to as down-sampling. For each layer a respective set meta-parameters are defined. These meta-parameters include the number of filters employed, the size of the filters, the stride of the convolution the down-sampling ratio, the size of the down-sampling size, the stride thereof, the activation function employed and the like. Reference is now made to FIG. 1, which is a schematic illustration of a CNN, generally referenced 10, which is known in the art. CNN 10 is employed for detecting features in an image such as image 16. Neural network 10 includes a plurality of layers, such as layer $12_1$ (FIG. 1). CNN 10 includes a plurality of layers $12_1$, $12_2$, . . . , $12_N$ and a classifier 14. An input image 16 is supplied to layer $12_1$. Layer $12_1$ at least convolves image 16 with the respective filters thereof and multiplies each of the outputs of the filters by an activation function. Layer $12_1$ provides the output thereof to layer $12_2$ which performs the respective operations thereof with the respective filters. This process repeats until the output of layer $12_N$ is provided to classifier 14. The output of Layer $12_N$ is a map of features corresponding to the filters employed in CNN 10. This feature map relates to the probability that a feature is present in input image 16 within respective image windows associated with the feature map. The features map at the output of layer $12_N$ can be embodied as a plurality of matrices, each corresponding to a feature, where the value of entry in each matrix represents the probability that input image 16 includes the feature associated with that matrix, in a specific image window (i.e., a bounding box) associated with the entry location in the matrix (i.e., the indices of the entry). The size of the image window is determined according the number layers in CNN 10, the size of the kernels and the stride of the kernels during the convolution operation.

Classifier 14 may be any type of classifier known in the art (e.g., Random Forest Classifier, Support Vector Machine—SVM classifier, a convolutional classifier and the like). Classifier 14 classifies the objects which the CNN 10 was trained to detect. Classifier 14 may provide for each image window, a respective detection confidence level that an object is located in that image window as well as classification information. In general, the output of classifier 14 is a vector or vectors of values relating to the detection and classification of the object in a corresponding image window. This vector or vectors of values are referred to herein as a 'classification vector'.

Reference is now made to FIG. 2, which is a schematic illustration of an exemplary CNN, generally referenced 50, which is known in the art. CNN includes two layers, a first layer $51_1$ and a second layer $51_2$. First layer $51_1$ receives image 52 as input thereto. In first layer $51_1$, a convolution operation in performed while in second layer $51_2$ an activation function is applied on the results of the convolution. Image 52 includes a matrix of pixels where each pixel is associated with a respective value (e.g., grey level value) or values (e.g., color values). Image 52 may represent a scene which includes objects (e.g. a person walking in the street, a dog playing in a park, a vehicle in a street and the like).

In first layer $51_1$, image 52 is convolved with each one of filters $54_1$ and $54_2$. Filters $54_1$ and $54_2$ are also referred to as convolution kernels or just kernels. Accordingly, each one of filters $54_1$ and $54_2$ is shifted over selected positions in the image. At each selected position, the pixel values overlapping with filter are multiplied by the respective weights of the filter and the result of this multiplication is summed (i.e., a multiply and sum operation). Generally, the selected positions are defined by shifting the filter over the image by a predetermined step size referred to as 'stride'. Each one of filters $54_1$ and $54_2$ corresponds to a feature to be identified in the image. The sizes of the filters as well as the stride are design parameters selected by the CNN designer. Convolving image 52 with each one of filters $54_1$ and $54_2$ produces a feature map which includes two feature images or matrices, feature image $56_1$ and feature image $56_2$ respective of filters $54_1$ and $54_2$ (i.e., a respective image is produced for each filter). Each pixel or entry in the feature image corresponds to the result of one multiplication and sum operation. Thus, each one of matrices $56_1$ and $56_2$ is associated with a respective image feature corresponding to the respective one of filters $54_1$ and $54_2$. Also, each entry is associated with a respective image window with respect to input image 52. Accordingly, the value of each entry in each one of matrices $56_1$ and $56_2$ represents the feature intensity of the feature associated therewith, within the image window associated with the entry. It is noted that the size (i.e., the number of pixels) of the feature images $56_1$ and $56_2$ may be smaller than the size of image 52. The output of first layer $51_1$ is provided to second layer $51_2$. In second layer $51_2$, each value in each of the feature images $56_1$ and $56_2$ is then applied as an input to an activation function 58 (e.g., sigmoid, Gaussian, hyperbolic tan h and the like). The output of layer $51_2$ is then provided to classifier 60 which detects and classifies objects in image 52 and produces a classification vector for each entry in the feature map.

Prior to detecting and classifying objects in an image, the weights of the various filters and parameters of the functions employed by a CNN such as CNN 10 (FIG. 1) or CNN 50 (FIG. 2) need to be determined. These weights parameters are determined in a training process. The initial weights and parameters of the CNN (i.e., before training is commenced) are determined arbitrarily (e.g., randomly). During training, a training image or images, in which the objects have been detected and classified, are provided as the input to the CNN. In other words, images with pre-determined respective classification vector for each image window are provided as an input to the CNN. The layers of the CNN network are applied to each training image and the classification vectors, respective of each training image, are determined (i.e., the objects therein are detected and classified). These classification vectors are compared with the pre-determined classification vectors. The error (e.g., the squared sum of differences, log loss, softmaxlog loss) between the classification vectors of the CNN and the pre-determined classification vectors is determined. This error is than employed to update the weights and parameters of the CNN in a backpropagation process which may include one or more iterations.

The publication "A convolutional Neural Network Cascade for Face Detection" to Li et al, directs to a CNN which includes three pairs of networks. Each pair contains classification (detection) network and bounding box regression network. During detection, an image pyramid is generated to allow multi-scale scanning of the image. Then, first classification network (DET12) is employed to scan all the windows in the image and filter those exhibiting low confidence. The first bounding box regression network (CLB12) is employed to correct the location of all remaining windows. Non-maximal suppression is then applied to remove windows with high overlap. In the next stage, a second classification network (DET24) is employed to filter the remaining windows, followed by a second bounding box regression network (CLB24) that performs bounding box regression. Finally, the third classification network (DET48) is employed followed by a third bounding box regression network (CLB48).

SUMMARY OF THE PRESENT DISCLOSED TECHNIQUE

It is an object of the disclosed technique to provide a novel convolutional neural network method and system. In accordance with the disclosed technique, there is thus provided a convolutional neural network system for detecting at least one object in at least one image. The system includes a plurality of object detectors, corresponding to a predetermined image window size in the at least one image. Each object detector is associated with a respective down-sampling ratio with respect to the at least one image. Each object detector includes a respective convolutional neural network and an object classifier coupled with the convolutional neural network. The respective convolutional neural network includes a plurality of convolution layers. The object classifier classifies objects in the image according to the results from the convolutional neural network. Object detectors associated with the same respective down-sampling ratio define at least one group of object detectors. Object detectors in a group of object detectors being associated with common convolution layers.

In accordance with another aspect of the disclosed technique, there is thus provided convolutional neural network method comprising the procedures of down-sampling an image according to a plurality of down-sampling ratios, to produce a plurality of down-sampled images. Each down-sampled image is associated with a respective down-sampling ratio. The method further includes the procedures of detecting for each down-sampled image, by a corresponding convolutional neural network, objects at a predetermined image window size with respect to at least one image and classifying objects in the image. Convolutional neural networks, detecting objects in respective down-sampled images associated with the same respective down-sampling ratio, define at least one group of convolutional neural networks. Convolutional neural networks in a group of convolutional neural networks being associated with common convolution layers.

BRIEF DESCRIPTION OF THE DRAWINGS

The disclosed technique will be understood and appreciated more fully from the following detailed description taken in conjunction with the drawings in which:

FIGS. 5A-5H are schematic illustrations of images with objects therein, employed for determining a training set, in accordance with a further embodiment of the disclosed technique;

DETAILED DESCRIPTION OF THE EMBODIMENTS

The disclosed technique overcomes the disadvantages of the prior art by providing a CNN network system for detecting an object in an image. The CNN network according to the disclosed technique includes a plurality of object detectors. Each object detector is associated with a respective predetermined image window size in the image. Each object detector is associated with a respective down-sampling ratio at the input thereto with respect to the image. Each object detector at least includes a respective CNN which includes a plurality of convolution layers. Each convolution layer convolves the input thereto with a plurality of filters and the results of this convolution are processed by an activation function. Each object detector further includes an object classifier, coupled with the convolutional neural network, for classifying objects in the image according to the results from the convolutional neural network. Object detectors associated with the same respective down-sampling ratio define at least one group of object detectors. Object detectors in a group of object detectors share common convolution layers. Thus, these common convolution layers may be computed once for all object detectors in the group of object detectors.

Also, according to the disclosed technique, object detectors, associated with the same respective image window size with respect to CNN input image, define a scale detector. Each scale detector is associated with a respective scale of the CNN input image. When scale detectors exhibit the same configuration of object detectors and down samplers, and when the CNNs in the object detectors exhibit groups of layers with identical characteristics then, the objects detectors are trained to have common layers as further explained below. Once the weights and parameters of the CNNs of the training scale detector are determined, duplicates of this training scale detector are deployed to define the CNN system of the disclosed technique.

Also, the number of samples employed for training a CNN may be increased beyond an initial number by aligning each sample with feature reference locations and randomly perturbing the samples, as further explained in conjunction with FIGS. 5A-5H and 6.

Figure 1:
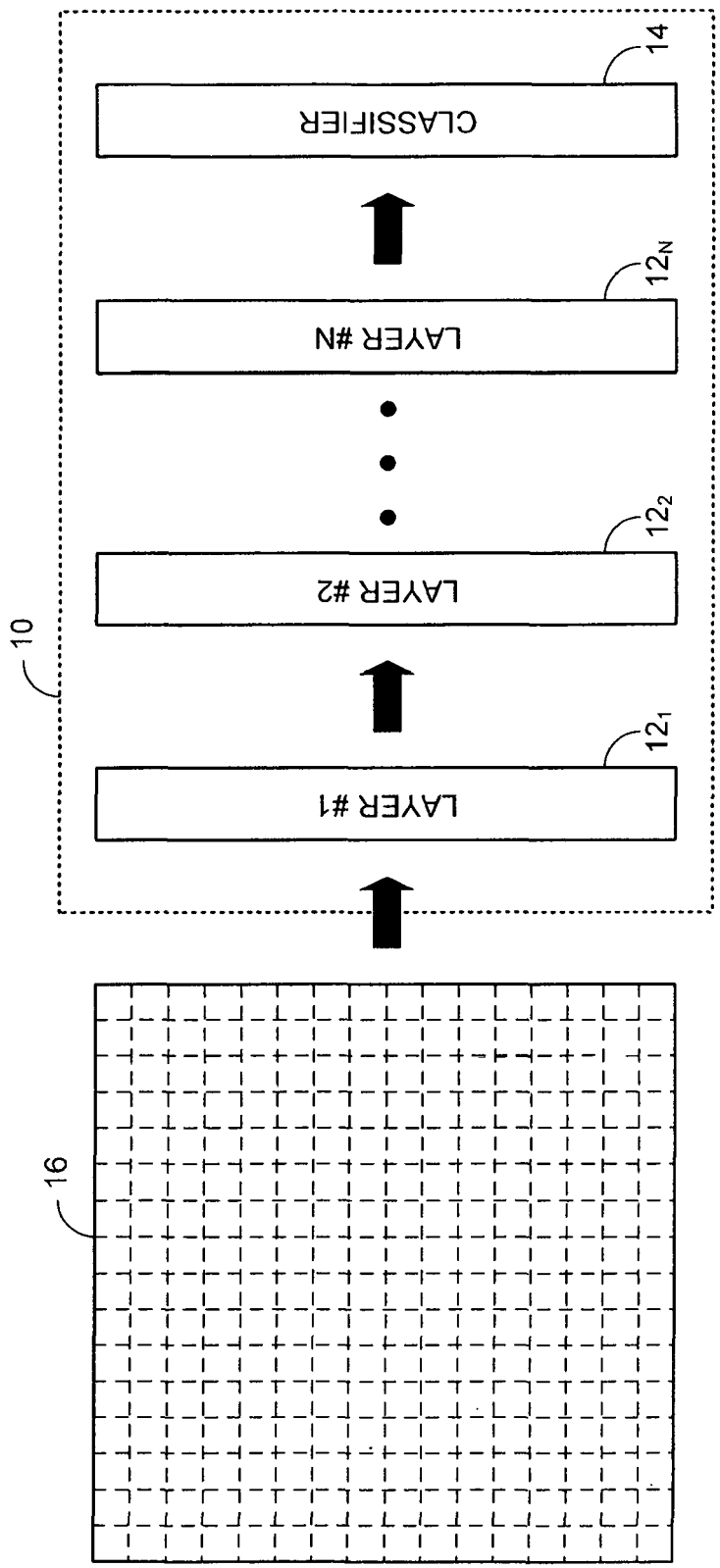
FIG. 1 is a schematic illustration of a CNN, which is known in the art.
Figure 2:
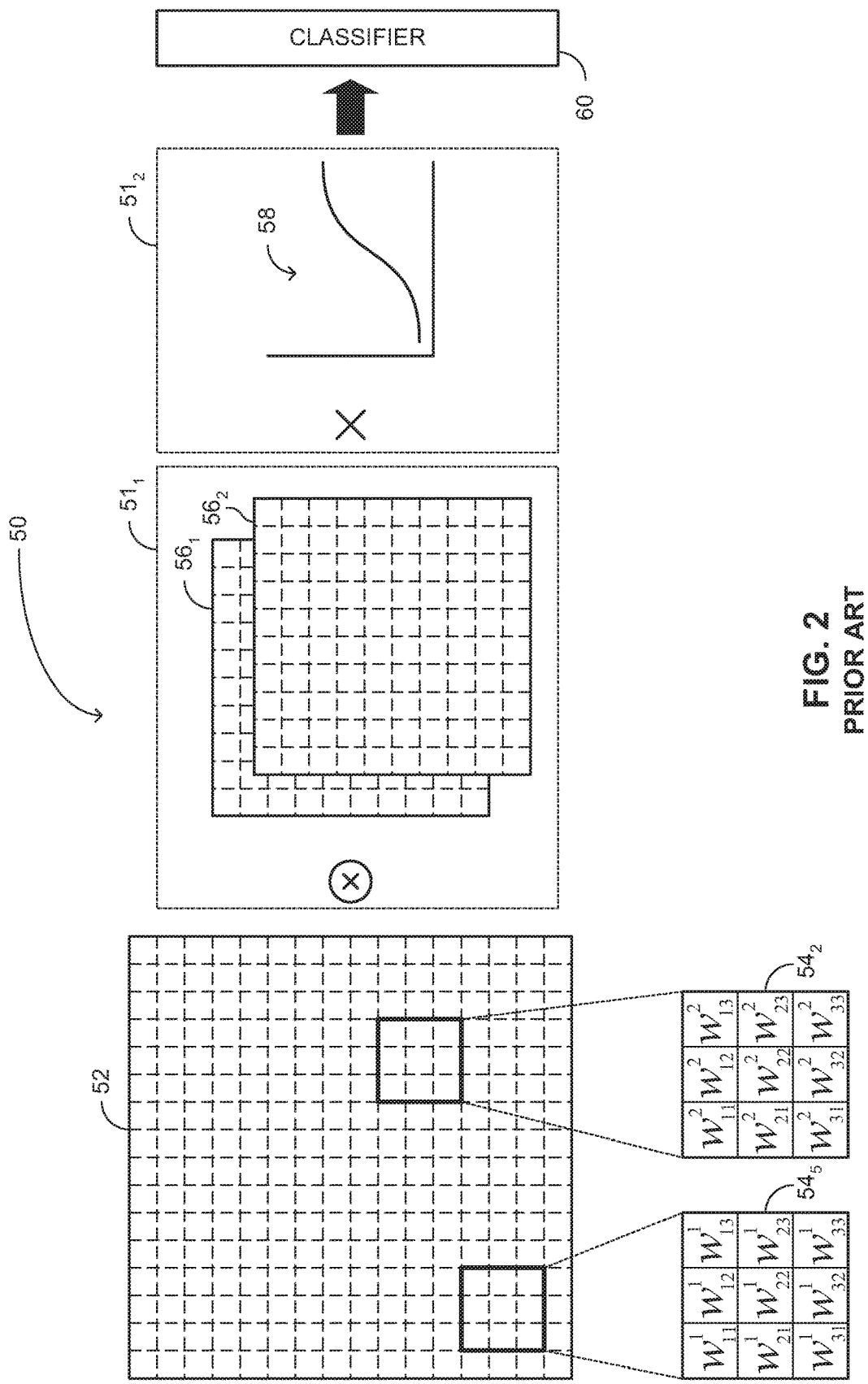
FIG. 2, is a schematic illustration of an exemplary CNN, which is known in the art.
Figure 3A:
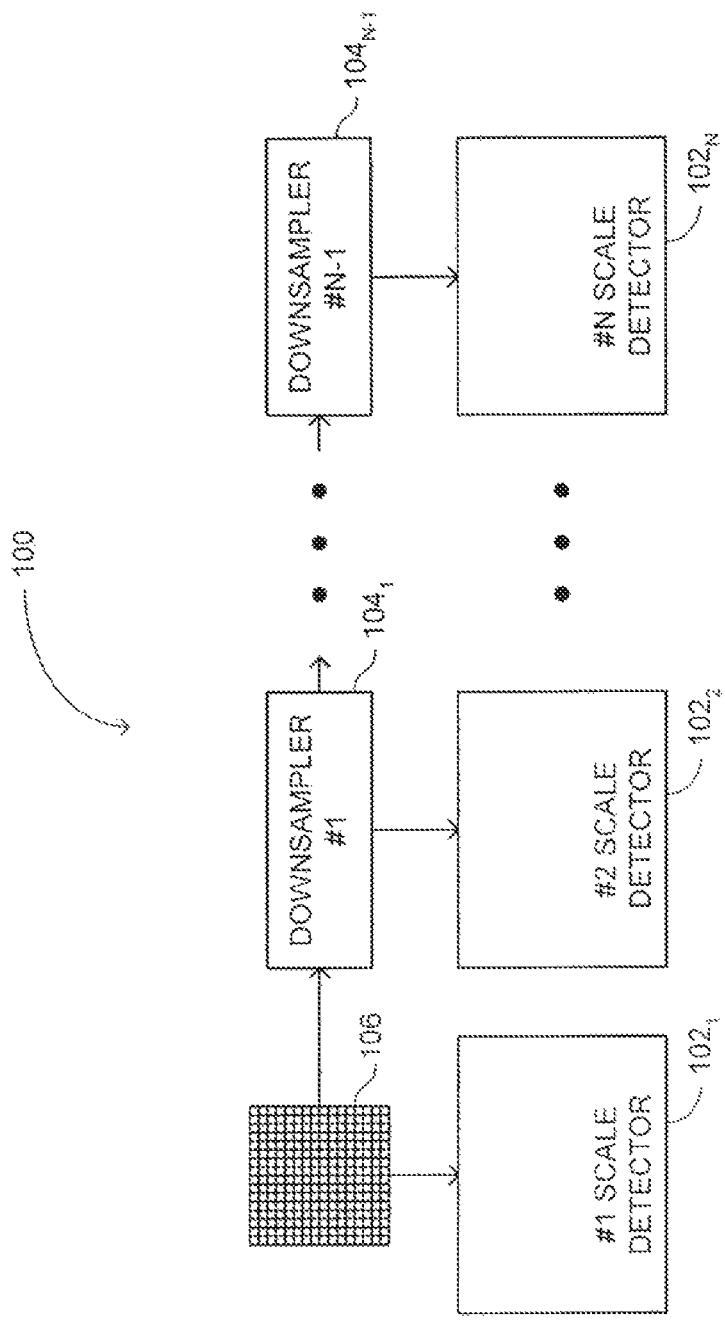
FIGS. 3A and 3B, are schematic illustrations a CNN system for detecting objects in an input image, in accordance with an embodiment of the disclosed technique.
Figure 3B:
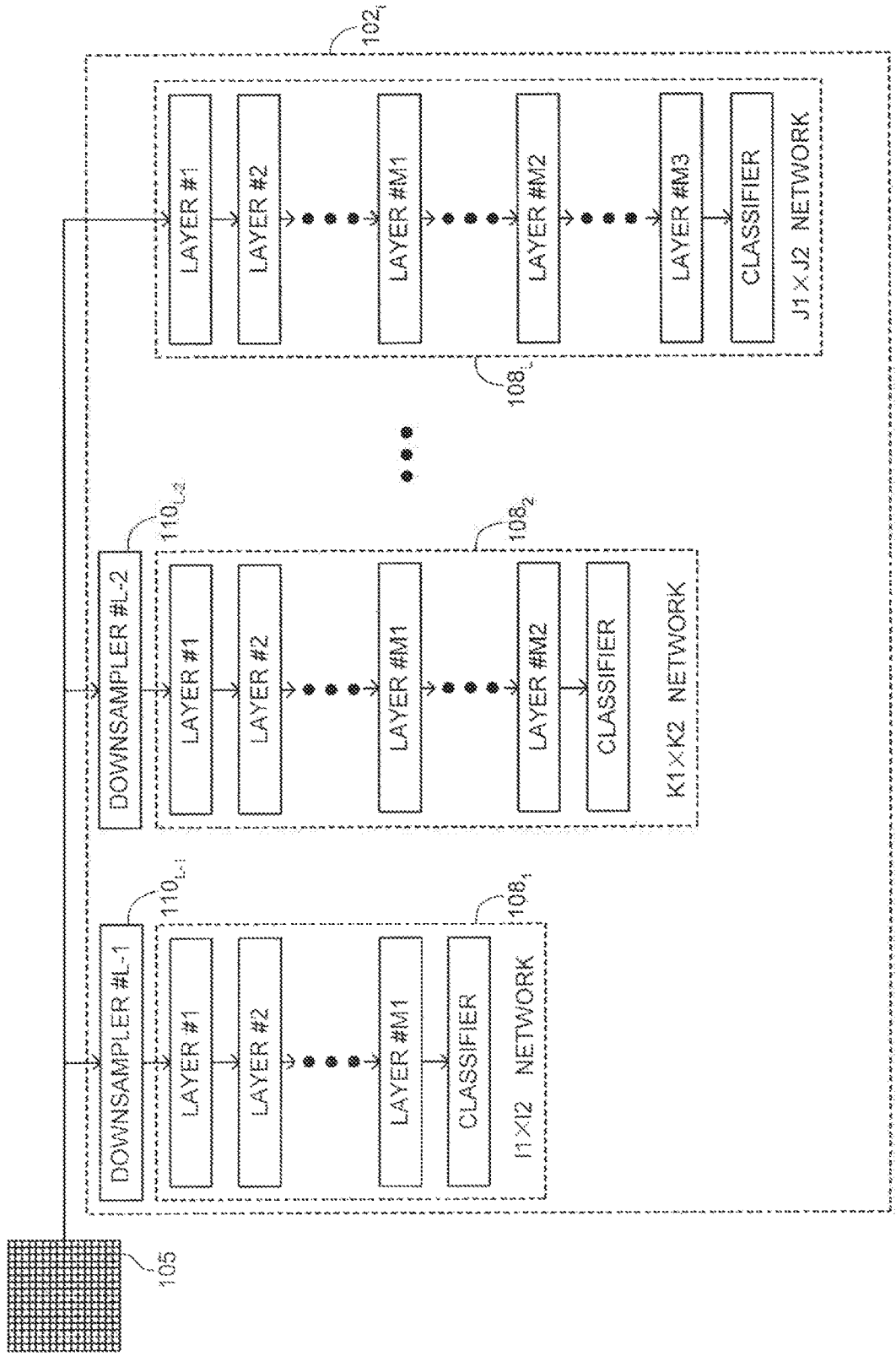

Reference is now made to FIGS. 3A and 3B, which are schematic illustrations a CNN system, generally reference 100, for detecting objects in an input image 106, in accordance with an embodiment of the disclosed technique. CNN system 100 includes a plurality of scale detectors $102_1$, $102_2$, ..., $102_N$ and a plurality of down-samplers $104_1$-$104_{N-1}$. Each one of down-samplers $104_1$-$104_{N-1}$ is associated with a respective down-sampling ratio. Each one of scale detectors $102_2$, ..., $102_N$ is coupled, at the input thereof, with a respective down-sampler $104_1$-$104_{N-1}$. Thus, each scale detector is associated with a respective down-sampling ratio (i.e., scale) with respect to input image 106. Scale detector $102_1$ receives, at the input thereof, input image 106 (i.e., the down-sampling ratio respective of scale detector $102_1$ is one). System 100 can be regarded as a multi-scale object detector, where each one of scale detectors $102_2$, ..., $102_N$ receives at the input thereof a down-sampled version of input image 106. In other words, each one of scale detectors $102_1$, $102_2$, ..., $102_N$ is associated with a respective scale of input image 106. In FIG. 3A, down-samplers $104_1$-$104_{N-1}$ are arranged in a cascade of down-samplers, where each down-sampler receives at the input thereof the output of the previous down-sampler (i.e., except for down-sampler $104_1$ which receives input image 106 at the input thereof). However, down-samplers $104_1$-$104_{N-1}$ may be arranged in parallel where each down-sampler receives input image 106 at the input thereof and down-samples input image 106 by a corresponding down-sampling ratio associated with the respective one of scale detectors $102_2$, ..., $102_N$.

With reference to FIG. 3B, depicted therein is a scale detectors $102_i$, which is one of scale detectors $102_1$, $102_2$, ..., $102_N$. Object detector $102_i$ includes a plurality of object detectors $108_1$, $108_2$, ..., $108_L$ and a plurality of L−1 down-samplers, out of which down-samplers $110_{L-1}$ and $110_{L-2}$ are depicted in FIG. 3B. Each on of object detectors $108_1$, $108_2$, ..., $108_L$ includes a respective CNN and a classifier. Each CNN includes a plurality of convolution layers. Object detector $108_1$ includes M1 layers, object detector $108_2$ includes M2 layers and object detector $108_3$ includes M3 layers where M1, M2 and M3 are integer numbers. Without loss of generality M3>=M2>=M1.

Each one of object detectors is also associated with a respective image window size with respect to the image at the input thereto. In the example brought forth in FIG. 3B, object detectors $108_1$ is associated with an image window size of I1×I2 with respect to the down-sampled image at the input thereto, object detectors $108_2$ is associated with an image window size of K1×K2 with respect to the down-sampled image at the input thereto and object detector $108_L$ is associated with an image window size of J1×J2 with respect to the image at the input thereto (i.e., which may be a down-sampled image, or original input image 106 when object detector $108_L$ is located in scale detector $102_1$). I1, K1, and J1 correspond to the width of the image window size and I2, K2 and J2 correspond to the height of the image window size. As such, each one of object detectors $108_1$, $108_2$, ..., $108_L$ is associated with the same respective image window size with respect to input image 106. This respective image window size (i.e., the receptive field) is related to the down-sampling ratio associated with each $108_1$, $108_2$, ..., $108_L$ at the input thereto, the number of convolution layers in each object detector, the size of the kernels and the stride of the kernels during the convolution operation.

The output of each CNN is coupled with the respective classifier. The input of each one of detectors $108_1$, $108_2$, ..., $108_{L-1}$ is coupled with a respective down-sampler. Each down-sampler, and object detector $108_L$, receives an image 105, which may be a down-sampled version of input image 106 at the input thereof. Each one of down-samplers down-samples the input image thereto by a respective down-sampling ratio and provides the down-sampled image to the respective one of object detectors $108_1$, $108_2$, ..., $108_{L-1}$. Consequently each one of $108_1$, $108_2$, ..., $108_L$ is associated with a respective down-sampling ratio with respect to input image 106. This respective down-sampling ratio is determined by the down-sampling ratios of down-samplers $104_1$-$104_{N-1}$ and the down-sampling ratios of the down-samplers coupled with each of object detectors $108_1$, $108_2$, ..., $108_L$.

Each layer of the respective CNN in each one of object detectors $108_1$, $108_2$, ..., $108_L$ convolves the image provided thereto with corresponding filters. The output of each CNN is a map of features corresponding to the filters employed by the CNN. The feature map includes entries of values. Each value of each entry in the feature map represents the feature intensity of the features associated various filters, within an image window associated with the entry. This features map is provided to the respective classifier. Each classifier classifies the objects which CNN system 100 was trained to detect and provides, for each image window, a classification vector. This classification vector includes values relating to a detection confidence level that an object is located in that image window and may further include image window correction factors (i.e., bounding box regression) as further elaborated below.

As further exemplified below in conjunction with FIG. 4, each one of object detectors $108_1$, $108_2$, ..., $108_L$ is associated with a respective down-sampling ratio with respect to the input image 104. Object detectors with the same respective down-sampling ratio define a group of object detectors. According to the disclosed technique, object detectors in a group of object detectors are associated with common convolution layers (i.e., since the input image to these object detectors is the same). As such, these common convolutional layers need to be computed only once for each group of object detectors.

As mentioned above, the output of each one of object detectors $108_1$, $108_2$, ..., $108_L$ is associated with a respective image window size with respect to input image 106. As such, when a plurality of scale detectors are employed, there can be more than one object detector associated with the same respective image window size. Accordingly, only one of these object detectors may be employed for detecting and classifying objects (i.e., within image windows associated with the respective image window size) in input image 104. However, if the detection confidence levels are not sufficient, another object detector, with a larger number of layers may be employed, thus reducing (i.e., on average) the computational complexity (e.g., in terms of the number of operations performed). The other object detector processes only the image windows with probabilities that an object is located therein, above a pre-determined value. In other words, prior employing the other object detector, the image windows relating to the background are removed according to the probabilities determined by the first object detector.

Figure 4:
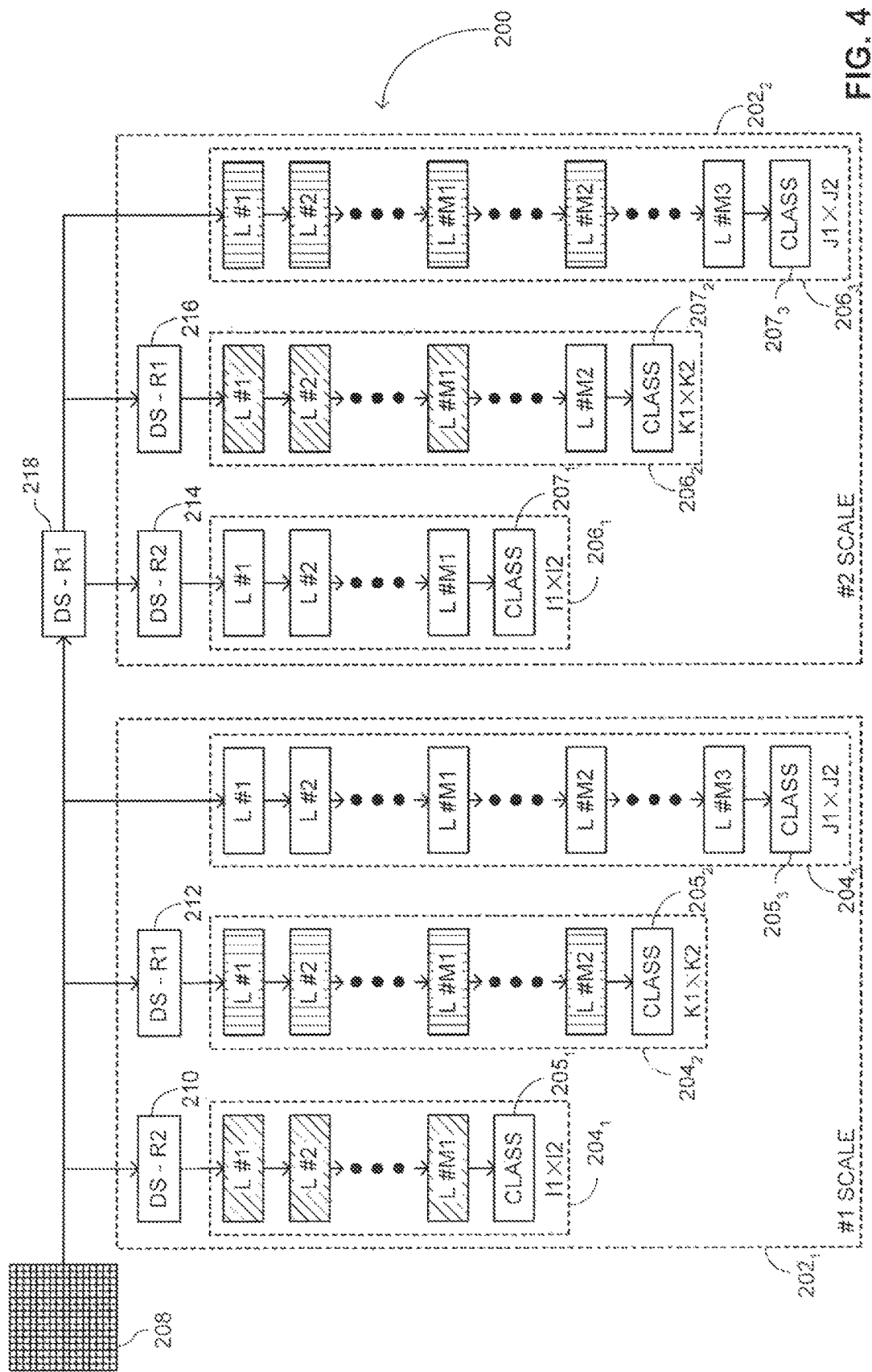
FIG. 4 is a schematic illustration of an exemplary CNN system for detecting objects in an input image, constructed and operative in accordance with another embodiment of the disclosed technique.

Reference is now made to FIG. 4, which is a schematic illustration of an exemplary CNN system, generally referenced 200, for detecting objects in an input image, constructed and operative in accordance with another embodiment of the disclosed technique. Exemplary CNN system 200 includes two scale detectors, a first scale detector $202_1$ and a second scale detector $202_2$ and a down-sampler 218. Each one of first scale detector $202_1$ and second scale detector $202_2$ includes a plurality of object detectors and a plurality of down-samplers. A down-sampler is abbreviated 'DS' in FIG. 4. First scale detector $202_1$ includes object detectors $204_1$, $204_2$ and $204_3$ and down-samplers 210 and 212. Second scale detector $202_2$ includes object detectors $206_1$, $206_2$ and $206_3$ and down-samplers 214 and 216. Each one of object detectors $204_1$, $204_2$, $204_3$, $206_1$, $206_2$ and $206_3$ includes a respective CNN and a respective classifier (abbreviated 'CLASS' in FIGS. 4) $205_1$, $205_2$, $205_3$, $207_1$, $207_2$ and $207_3$. Each CNN includes a plurality of convolution layers (abbreviated in FIG. 4). The CNNs of object detectors $204_1$ and $206_1$ include M1 layers, the CNNs of object detectors $204_2$ and $206_2$ include M2 layers and the CNNs of object detectors $204_3$ and $206_3$ include M3 layers where M1, M2 and M3 are integer numbers. Without loss of generality, M3>=M2>=M1.

Each one of object detectors is also associated with a respective image window size with respect to the image at the input thereto. In the example brought forth in FIG. 4, object detectors $204_1$ and $206_1$ are associated with an image window size of I1×I2 with respect to the down-sampled image at the input thereto, object detectors $204_2$ and $206_2$ are associated with an image window size of K1×K2 with respect to the down-sampled image at the input thereto and object detectors $204_3$ and $206_3$ are associated with an image window size of J1×J2 with respect to the image at the input thereto (i.e., only the input image to object detector $206_3$ is down-sampled). I1, K1, and J1 correspond to the width of the image window size and I2, K2 and J2 correspond to the height of the image window size. As such, each one of object detectors $204_1$, $204_2$, $204_3$, $206_1$, $206_2$ and $206_3$ is associated with a respective image window size with respect to input image 208. This respective image window size is determined according to the down-sampling ratio at associated with each one of object detectors $204_1$, $204_2$, $204_3$, $206_1$, $206_2$ and $206_3$ at the input thereto, the number of convolution layers in each object detector, the size of the kernels and the stride of the kernels during the convolution operation. The respective image window size of each one of object detectors $204_1$, $204_2$, $204_3$, $206_1$, $206_2$ and $206_3$ with respect to input image 208, is related to the respective image window size at the input thereto, by the respective down-sampling ratio associated with each one of object detector $204_1$, $204_2$, $204_3$, $206_1$, $206_2$ and $206_3$. For example, the respective image window size of detector $204_1$, with respect to input image 208, is R2*I1×R2*I2. Similarly, the respective image window size of detector $204_2$, with respect to input image 208, is R1*K1×R1*K2.

The output of each convolutional network is coupled with the input of the respective classifier $205_1$, $205_2$, $205_3$, $207_1$, $207_2$ and $207_3$. In the arrangement depicted in FIG. 4, each one of object detectors $204_1$, $204_2$, $204_3$, $206_1$, $206_2$ and $206_3$ is coupled with a respective down-sampler. The input of object detector $204_1$ is coupled with the output of down-sampler 210. The input of object detector $204_2$ is coupled with the output of down-sampler 212. The input of object detector $206_1$ is coupled with the output of down-sampler 214. The input of object detector $206_2$ is coupled with output of down-sampler 216 and the input of object detector $206_3$ is coupled with the output down-sampler 218. The input of down-samplers 214 and 216 are also coupled with output of down-sampler 218.

Object detector $204_3$, down-sampler 210, down-sampler 212 and down-sampler 218 receive input image 208 at the input thereof. Each of down-sampler 210, down-sampler 212 and down-sampler 218 down-samples input image 208 by the respective down-sampling ratio thereof. Down-sampler 210 provides the down-sampled image to object detector $204_1$. Down-sampler 212 provides the down-sampled image to object detector $204_2$ and down-sampler 218 provides the down-sampled image to object detector $206_3$, to down-sampler 214 and to down-sampler 216. Down-sampler 214 down-samples further the image provided thereto, and provides the twice down-sampled image to object detector $206_1$. Down-sampler 216 also down-samples further the image provided thereto, and provides the twice down-sampled image to object detector $206_2$.

Each layer of the respective CNN in each one of object detectors $204_1$, $204_2$, $204_3$, $206_1$, $206_2$ and $206_3$ convolves the image provided thereto with corresponding filters. The output of each CNN is a map of features corresponding to the filters employed in the CNN. As described above, the feature map includes values where each value of each entry in the feature map represents the feature intensity of the features associated various filters, within the image window associated with the entry. Each of the feature maps is provided to the respective one of classifier $205_1$, $205_2$, $205_3$, $207_1$, $207_2$ and $207_3$.

Each one of classifiers $205_1$, $205_2$, $205_3$, $207_1$, $207_2$ and $207_3$ receives respective matrices as an input thereto. Each one of classifiers $205_1$, $205_2$, $205_3$, $207_1$, $207_2$ and $207_3$ determines a classification vector. This classification vector includes values relating to the probability that an object or objects (i.e., which the CNN was trained to detect) is located at each of the image windows associated the features map provided thereto. Furthermore, the classification vector determined by each one of classifiers $205_1$, $205_2$, $205_3$, $207_1$, $207_2$ and $207_3$ include values relating to image window correction factors for each of the image windows associated the features map provided thereto. These image window correction factors include for example corrections to the width and the height of the image window. These image window correction factors may further include corrections to the location of the image window as well as the orientation of the image window. These image window correction factors are a part of the classification vector the CNN is trained to provide, as further elaborated below. A classification vector includes, for example, binary values, which specifies that the sample belongs to a specific class. For example, a vector [1,0] indicates that the sample belongs to a "FACE" class and doesn't belong to "NOT-FACE" class. The classification vector may include more than two classes. In addition, this vector may include numeric representation of additional information such as 3D pose, attributes (age, gender in faces, color or make in cars), bounding box regression target values and the like Each one of classifiers $205_1$, $205_2$, $205_3$, $207_1$, $207_2$ and $207_3$ may be embodied as a convolution classifier, which convolves a classification filter or filters, with the features map (e.g., a 1×1×Q×N filter where Q is the number of matrices in the feature map and N is the number of classification filters related to the classification information to be determined), where the output of such filter or filters are the above mentioned probabilities and correction factors. The parameters of such a convolution classifier as determined during the training of the CNN as further explained below.

As mentioned above, each one of object detectors $204_1$, $204_2$, $204_3$, $206_1$, $206_2$ and $206_3$ is associated with a respective down-sampling ratio at the input thereto, with respect to the input image 208 to CNN 200 (i.e., the image in which the objects are being detected). Further as mentioned above, object detectors with the same respective down-sampling ratio at the input thereto, define a group of object detectors. In CNN system 200, down-samplers 212 and 218 down-sample input image 208 by the same first down-sampling ratio, R1. Down-sampler 216 down-samples input image 208 further by the down-sampling ratio R1. Thus, the sampling ratio associated with object detector 206₂ is R1*R1. Down-sampler 210 down-sample input image 208 by a second down-sampling ratio, R2, different from R1. When R2=R1*R1, then, object detectors 204₁ and 206₂ are associated with the same respective down-sampling ratio (i.e., R2) and define a group of object detectors (i.e., as indicated by the left diagonal hatching in FIG. 4). Similarly, object detectors 204₂ and 206₃ are associated with the same down-sampling ratio (i.e., R1) and define another group of object detectors (i.e., as indicated by the vertical hatching in FIG. 4). Down-sampler 214 down-samples the output form down-sampler 218 by a down-sampling ratio R2. It is noted that the down-sampling arrangement depicted in FIG. 4 is brought herein as an example only. As a further example, since in FIG. 4, three down-sampling ratios are employed (i.e., R1, R2 and R1*R2), then three down-samplers are sufficient, where the output of each down-sampler is provided to the object detectors associated with the down-sampling ratio of the down-sampler. Such three down-sampler may be arranged in parallel or in a cascade of down-samplers.

According to the disclosed technique, object detectors associated with the same respective down-sampling ratio at the input therein define a group of object detectors. Object detectors in the same group of object detectors are associated with common convolution layers (i.e., since the size of the input image to these object detectors is the same). These common convolutional layers share the same convolution kernels (i.e., filters) and operate on the same image size at the input thereto. As such, these common convolutional layers need to be computed only once for each group of object detectors. In FIG. 4, object detectors 204₁ and 206₂ are associated with the same respective down-sampling ratio at the input thereto and define a group of object detectors. As such Layers 1-M1 in object detectors 204₁ and 206₂ are common layers. Thus, layers 1-M1 in object detectors 204₁ and 206₂ and may be computed once during object detection. Object detector 206₂ employs the result from layer M1 to continue and compute layers M1+1-M2. Similarly, object detectors 204₂ and 206₃ are associated with the same respective down-sampling ratio and define a group of object detectors. As such Layers 1-M2 in object detectors 204₂ and 206₃ are common layers and may be computed once. Object detector 206₃ employs the result from layer M2 to continue and compute layers M2+1-M3. In general, since the object detectors in a group may be associated with different scale detectors. Thus, CNNs of the object detectors in a group of object detectors may be regarded as producing features maps at different scales of an image pyramid and the features map produced by the CNN of one object detector at one scale is employed by the CNN of another object detector in another scale.

Also, as mentioned above, the output of each of object detectors 204₁, 204₂, 204₃ 206₁, 206₂ and 206₃ is associated with a respective image window size with respect to input image 208. Specifically, the output from object detectors 204₁, 204₂ and 204₃ are associated with the same first image window size in image 208. Similarly, the output from object detectors 206₁, 206₂ and 206₃ are associated with the same second image window size in image 208. As such, for the first image window size, only one of object detectors 204₁, 204₂ and 204₃ may be employed for detecting and classifying an object in input image 208. Similarly, for the second image window size, only one of object detectors 206₁, 206₂ and 206₃ may be employed for detecting and classifying an object in input image 208. Typically, the object detector with the CNN exhibiting a smaller number of layers is selected. However, if the detection confidence levels are not sufficient, a different detector, with a larger number of layers may be employed, thus reducing (i.e., on average) the computational complexity. For example, if the detection confidence produced by object detector 204₁ are not sufficient, then object detector 204₂ shall be employed. Nevertheless, object detector 204₂ may processes only the image windows with probabilities that an object is located in therein, above a pre-determined value. In other words, prior employing the object detector 204₂, the image windows relating to the background are removed according to the probabilities determined by object detector 204₁.

Training

As described above, a CNN according to the disclosed technique includes a plurality of scale detectors. Each scale detector includes a plurality of object detectors. Each object detector includes a respective CNN. When each of the scale detectors exhibit the same configuration of object detectors and down samplers, and when the CNNs in the object detectors exhibit layers with groups of layers with identical characteristics (i.e., exhibit the same filters sizes, strides and activation functions and are ordered the same), then the CNNs of the objects detectors are trained to have common layers.

The term 'group of layers with identical characteristics' herein above and below relate to groups of layers, where the layers in each group exhibits the same filters sizes, strides and activation functions and the layers in the groups are ordered the same. The term 'common layers' relate herein above and below relate to groups of layers with identical characteristics (i.e., in different object detectors), where corresponding layers in the groups (i.e., the first layer in each group, the second layer in each group etc.) have identical weights and parameters. For example, with reference to FIG. 4, scale detectors 202₁ and 202₂ exhibit the same configuration of object detectors and down samplers. Furthermore, layers 1-M1 in the CNNs of object detectors 204₁, 204₂, 204₃, 206₁, 206₂ and 206₃ are groups of layers with identical characteristics and the CNNs respective of these object detectors are trained to have common layers. Also, layers M1+1-M2 in the CNNs of object detectors 204₂, 204₃, 206₂ and 206₃ are also groups of layers with identical characteristics and the CNNs respective of these object detectors are trained to have common layers. Similarly, layers M2+1-M3 of the CNNs of object detectors object detectors 204₃ and 206₃ are groups of layers with identical characteristics and the CNNs respective of these object detectors are trained to have common layers.

According to one alternative, the objects detectors in the CNN system are provided with the same training sample or samples, each with a predetermined respective classification vector. The size of the sample or samples corresponds to the image window size, associated with each object detector with respect to the image at the input thereto (e.g., I1×I2, K1×K2 and J1×J2 in FIGS. 3B and 4). Each object detector employs the respective CNN and classifier to detect and classify objects in the training samples provided thereto and produces a classification vector respective of each sample. These classification vectors are compared with the pre-determined classification vectors. The error (e.g., the squared sum of differences, log loss, softmaxlog loss) between the classification vectors produced by a CNN respective of an object detector and the respective pre-determined classification vectors is determined. Correction factors for the weights and parameters that minimize this error are then determined for the weights and parameters of each CNN in each respective object detector. The weights and parameters of the CNNs are then updated accordingly. The weights and parameters of all the groups of layers with identical characteristics in the respective CNNs, of all object detectors are then averaged and applied to the respective groups of layers with identical characteristics to produce common layers. For example, the weights and parameters for first M1 layers, of all the CNNs in the all object detectors are averaged. Similarly, the weights and parameters for the M1+1-M2 layers of all the CNNs in the all object detectors averaged etc. It is noted that averaging updated weight and parameters and averaging corrections factors and updating the weights and parameters according to these averaged correction factors are equivalent when the CNNs are initialized with the same weights and parameters.

According to another alternative, when each of the scale detectors exhibit the same configuration of object detectors and down samplers, and when the CNNs in the object detectors exhibit groups of layers with identical characteristics then, a single instance of a scale detector may be trained. This single instance of a scale detector is referred to herein as 'the training scale detector'. To train a CNN according to the disclosed technique with a training scale detector, the training scale detector is provided with training samples, each with predetermined respective classification vectors. According to one alternative, an image including a list of objects and bounding boxes is provided to the training scale detector. According to another alternative, the samples exhibit a size similar (i.e., not necessarily identical) to the largest image window size (e.g., J1×J2 in FIGS. 3B and 4) with respect to the input to the object detectors in the scale detectors. These samples are then down sampled (i.e., by the down samples of the training scale detector similar to down samples $110_{L-1}$ and $110_{L-2}$ in object detector $102_i$—FIG. 3B), to produce training samples exhibiting the sizes respective of the other object detectors (e.g., I1×I2, K1×K2 in FIGS. 3B and 4). Each object detector employs the respective CNN and classifier to detect and classify objects in the training samples provided thereto and produces a classification vector respective of each sample. These classification vectors are compared with the pre-determined classification vectors. The error between the classification vectors of the CNN and the pre-determined classification vectors is determined To employ a plurality of scale detectors in a configuration such as described above in conjunction with FIGS. 3A, 3B and 4, correction factors for the weights and parameters that minimize the above mentioned error are then determined for the weights and parameters of each CNN in each respective object detector in the training scale detector. The weights and parameters of the CNNs are then updated accordingly. The weights and parameters of all the groups of layers with identical characteristics in the respective CNNs, of all object detectors in the training scale detector, are then averaged and applied to the respective groups of layers with identical characteristics to produce common layers. Once the weights and parameters of the CNNs of the training scale detector are determined, duplicates of this training scale detector are deployed to implement each one of scale detectors $108_1$-$108_N$ (FIG. 3A) and define the CNN system of the disclosed technique.

During training, the weights and parameters of the CNN are updated such that this error is minimized. Such an optimization may be implemented employing, for example, a gradient descent process such as Stochastic Gradient Descent (SGD). According to the gradient descent process, the corrections to the weights and parameters (or the new weights and parameters) determined for each layer in the CNN and each sample, are averaged for all samples. The corrections to the weights and parameters are determined according to partial derivatives of the error relative to weights and parameters of the CNN (i.e., since the CNN may be considered as a composite function). This process is repeated over a plurality of iteration, either for a determined number of iterations or until the error is below a predetermined value. According to the SGD, in each of the iterations, only a portion of the samples are employed in each of the iterations. Furthermore, employing the chain rule, the input to a layer, the output of the layer and the derivative of the output with respect to the error are required to determine the derivatives of the weights and parameters of that layer.

As mentioned above, the classification vector provide by a CNN according to the disclosed technique includes image window correction factors. To train a CNN to provide image window correction factors, during training, the difference between the location and orientation of the image window corresponding to each classification vector (i.e., as defined by the indices of this vector in the features map) and the actual location and orientation of the sample is determined. This difference is minimized using, for example, the stochastic gradient descent.

Training Data

In general, CNNs are trained to detect objects in an input image and produce information relating to the probability that the objects, which the CNN was trained to detect, exist at various locations in the input image. CNNs are trained using a training set, which includes samples (images or any other data), each associated with a pre-determined classification vector. The samples employed for training are typically image windows cropped from images. Each sample is classified (i.e., a class is determined for the sample) according to overlap of the image window with the objects in the image. When a sample does not overlap with any object in the image, that sample is classified as background. As mentioned above, the training process modifies the CNN parameters to reduce error (e.g., the squared sum of differences, log loss, softmaxlog loss) between the output values of the CNN and the values associated with the sample employed According to the disclosed technique, given an initial training set with an initial number of trainings samples, with detected and classified objects, the number of training samples in the training set may be increased beyond that initial number. In other words, a training set with a larger number of training samples is produced from the initial training set. Reference is now made FIGS. 5A-5H, which are schematic illustrations of images, 250, 280 and 310 with objects (e.g., faces) therein, employed for determining a training set, in accordance with a further embodiment of the disclosed technique. Initially, objects 253, 255, 283, 285, 313 and 315 are detected in images 250, 280 and 310. Thereafter, quadrilateral shaped boundaries, exhibiting predetermined sizes, are defined around the detected objects. Such as quadrilateral shaped boundaries is referred to herein above and below as the 'bounding box' of the object.

Each one of objects 253, 255, 283, 285, 313 and 315 in the images, 250, 280 and 310 is bound by a respective bounding box. In image 250, object 253 is bounded by bounding box 252 and object 255 is bounded by bounding box 254. In image 280, object 283 is bounded by bounding box 282 and object 285 is bounded by bounding box 284. In image 310, object 313 is bounded by bounding box 312 and object 315 is bounded by bounding box 314. Each bounding box exhibits a respective size. In image 250, 280 and 310, two different bounding boxes sizes are exemplified. Bounding boxes 252, 282 and 314 exhibit a first size and bounding boxes 254, 284 and 312 exhibits a second size. Each bounding box is associated with a respective relative coordinate system. Bounding box 252 is associated with coordinate system 256, bounding box 254 is associated with coordinate system 258, bounding box 282 is associated with coordinate system 286, bounding box 284 is associated with coordinate system 288, bounding box 312 is associated with coordinate system 316 and bounding box 214 is associated with coordinate system 318.

Figure 5A:
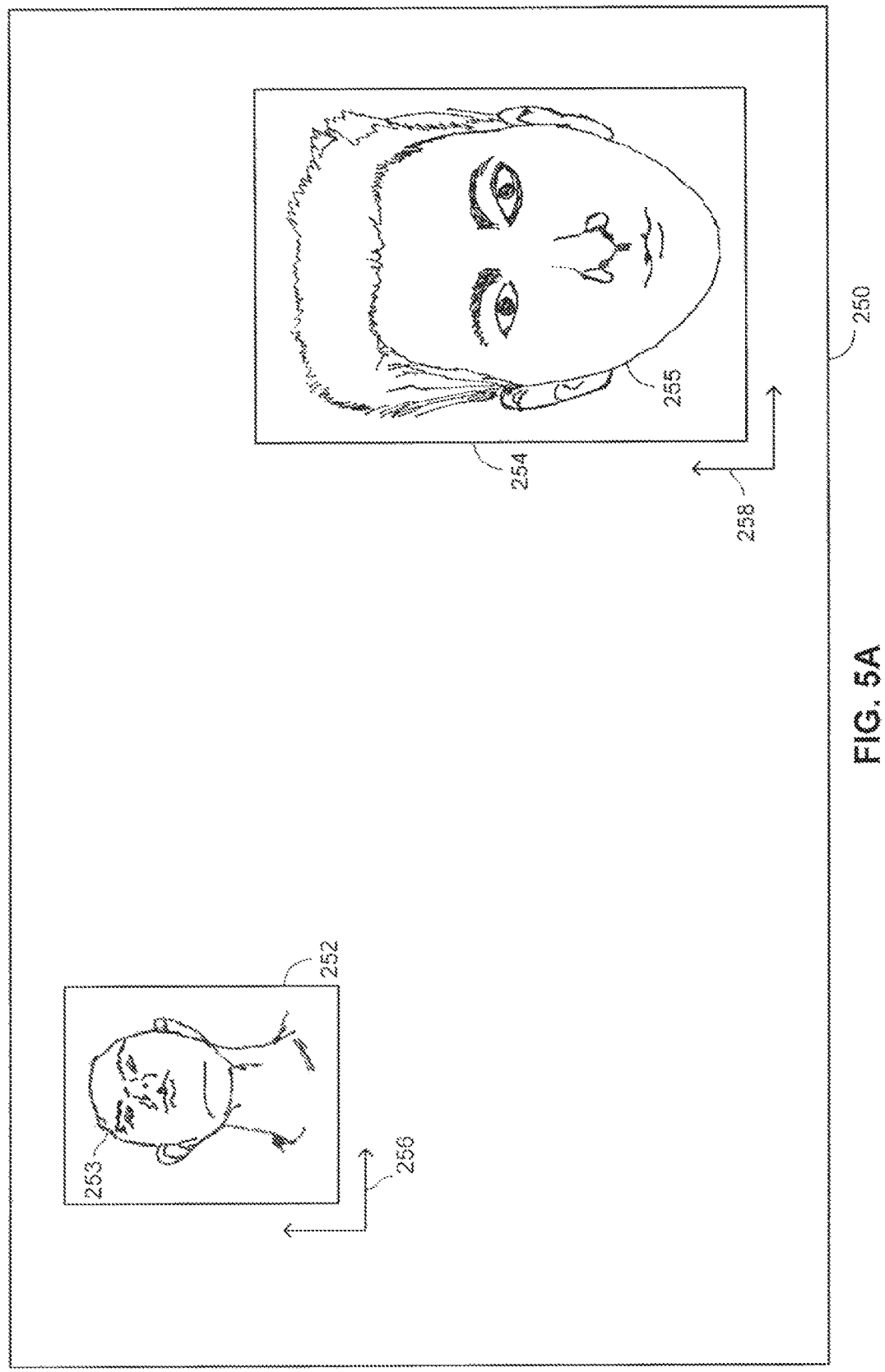
Figure 5B:
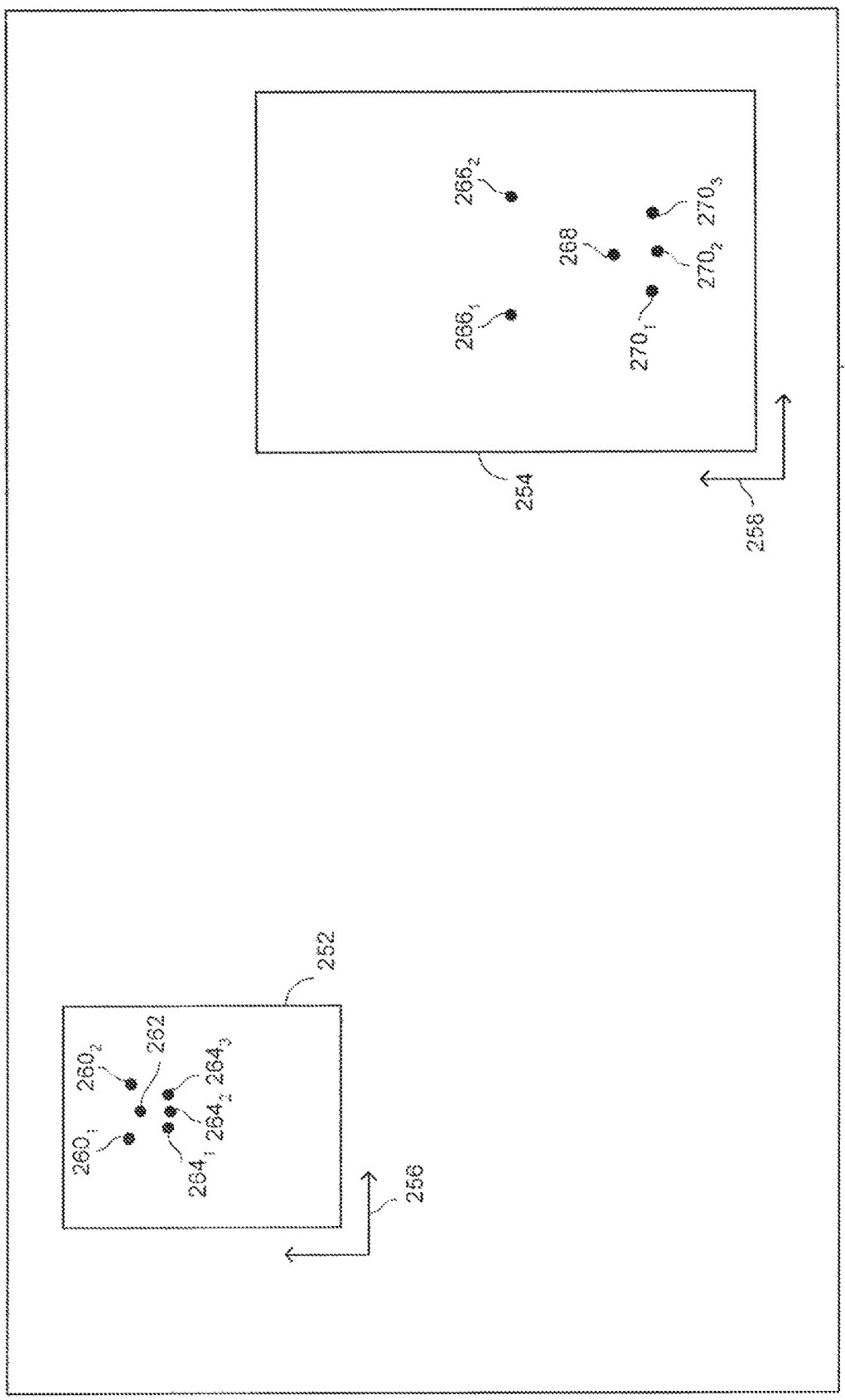
Figure 5C:
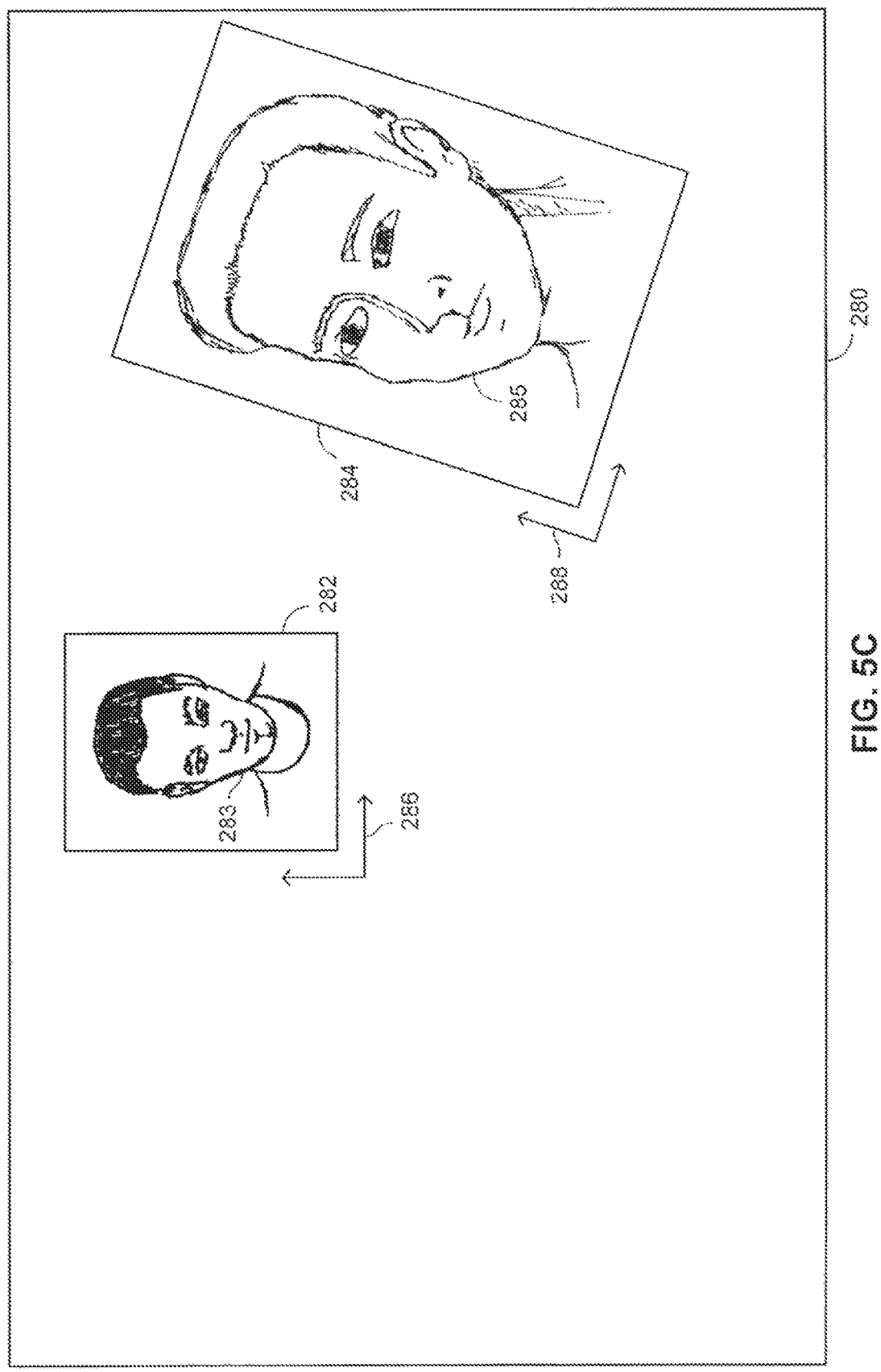
Figure 5D:
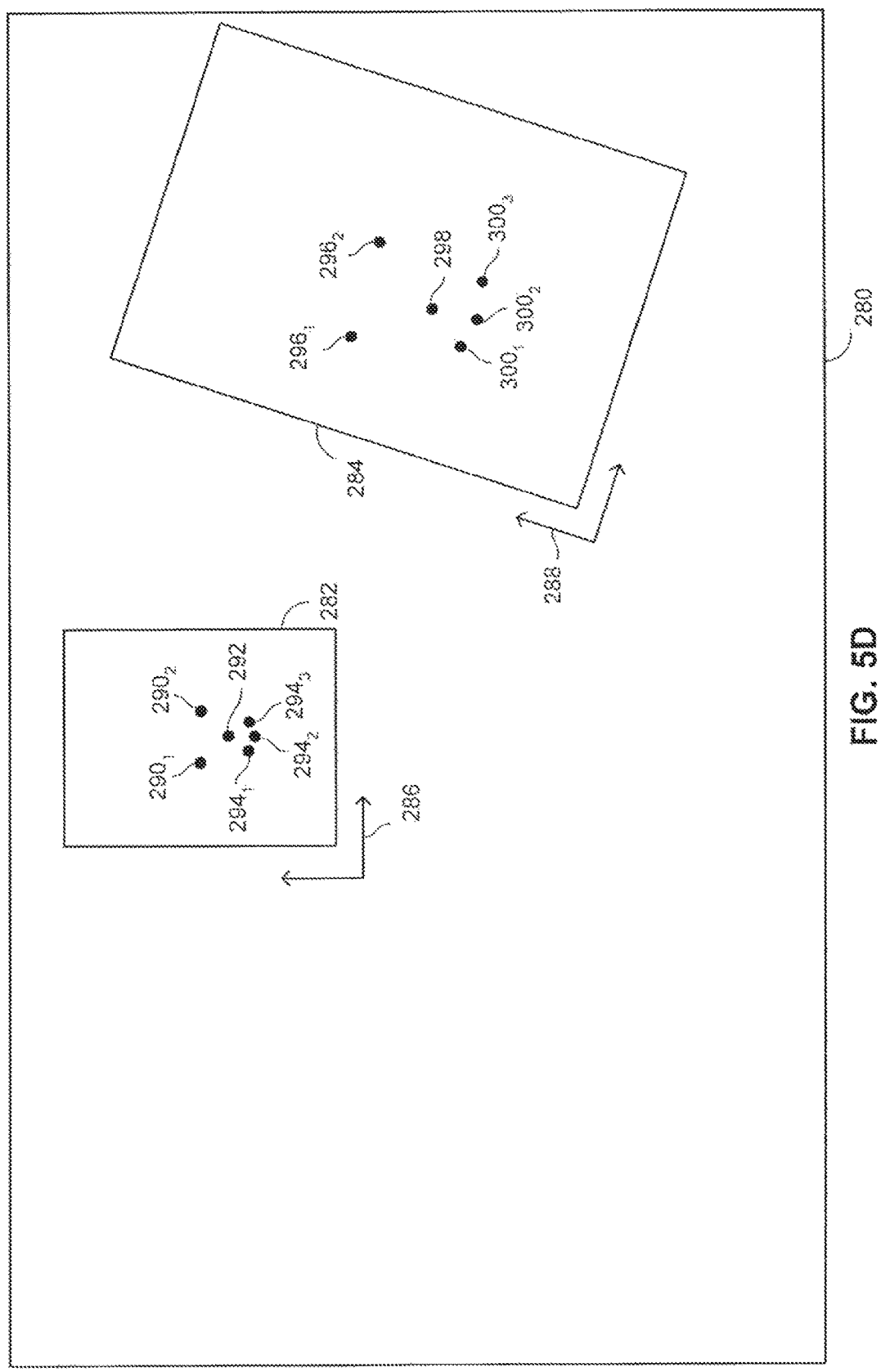
Figure 5E:
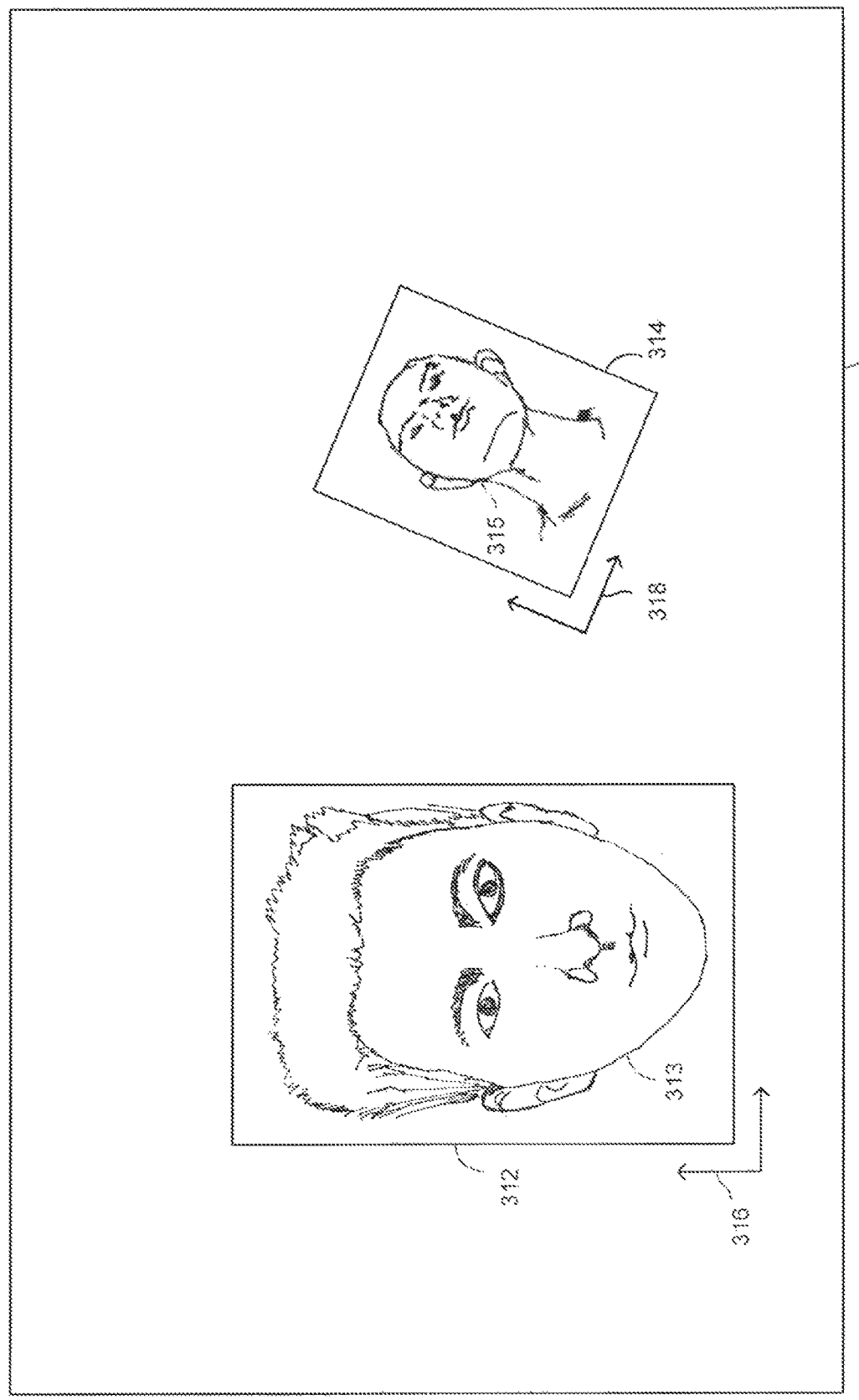

For each object key-point, a respective feature location is determined in the coordinate system associated with that bounding box. In the example brought forth in FIGS. 5A-5H, the feature types of the objects are the eyes the nose and the mouth of a face (i.e., the object is a face). With reference to FIG. 5B, points $260_1$ and $260_2$ represent the location of the eyes, point 262 represents the location of the nose and points $264_1$, $264_2$ and $264_3$ represent the location of the mouth of face 253 in coordinate system 256 bounding box 252. Similarly, points $266_1$ and $266_2$ represent the location of the eyes, point 268 represents the location of the nose and points $270_1$, $270_2$ and $270_3$ represent the location of the mouth of object 255 in in coordinate system 258 of bounding box 254. With reference to FIG. 5D, points $290_1$ and $290_2$ represent the location of the eyes, point 292 represents the location of the nose and points $294_1$, $294_2$ and $294_3$ represent the location of the mouth of object 283 in in coordinate system 286 bounding box 282. Similarly, points $296_1$ and $296_2$ represent the location of the eyes, point 298 represents the location of the nose and points $300_1$, $300_2$ and $300_3$ represent the location of the mouth of object 285 in in coordinate system 288 bounding box 284. With reference to FIG. 5F, points $320_1$ and $320_2$ represent the location of the eyes, point 322 represents the location of the nose and points $322_1$, $322_2$ and $322_3$ represent the location of the mouth of object 313 in in coordinate system 316 bounding box 312. Similarly, points $326_1$ and $326_2$ represent the location of the eyes, point 328 represents the location of the nose and points $329_1$, $329_2$ and $329_3$ represent the location of the mouth of object 315 in in coordinate system 218 bounding box 314. Typically, the locations of the object key-points in the respective coordinate system are normalized to be, for example, between zero and one (i.e., bounding box corners are located at coordinates [0,0], [0,1], [1,1], [1,0]). In other words, coordinate system 256, 258, 286, 288, 316 and 316 respective bounding boxes 252, 254, 282, 284, 312 and 314 respectively are normalized relative to the bounding box location and size. Thus, the locations of the various features can be related to independently of the bounding box size.

Figure 5H:
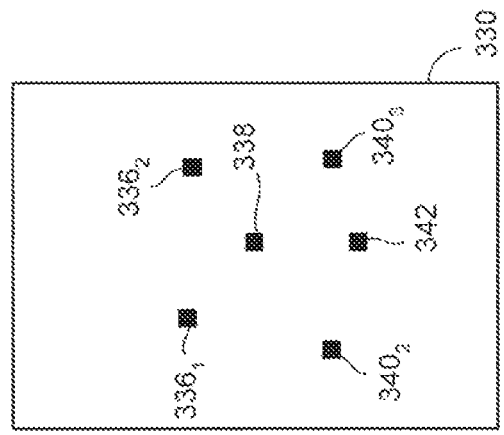
Figure 5G:
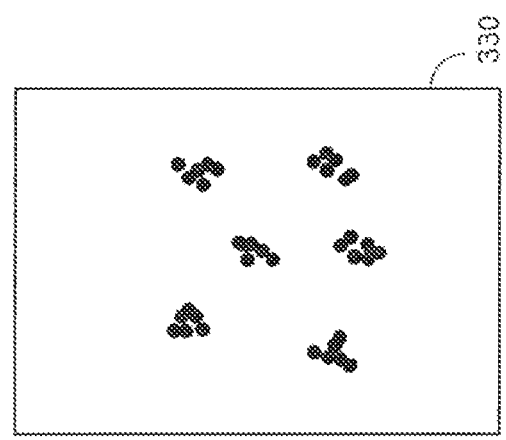

With reference to FIG. 5G, the normalized locations of the various object key-points are depicted superimposed in an arbitrary bounding box 330. Since coordinate systems of the bounding boxes are normalized (i.e., a location in one coordinate system corresponds to the same location in another coordinate system) the locations associated with the same object key-point type (e.g., the eye) in different bounding boxes, may be averaged.

Thereafter, for each object key-point type (e.g., eyes, nose, mouth), a feature reference location is determined. With reference to FIG. 5H, for a bounding box an arbitrary size, point $336_1$ represents the average location of the locations of points $260_1$, $290_1$, $326_1$ $266_1$, $296_1$ and $320_1$ and point $336_2$ represents the average location of the locations of points $260_2$, $290_2$, $326_2$ $266_2$, $296_2$ and $320_2$. Point 338 represents the average location of locations of points 262, 292, 328, 268, 298 and 322. Point $340_1$ represents the average location of the locations of points $264_1$, $294_1$, $329_1$, $270_1$, $300_1$ and $324_1$. Point $340_2$ represents the average location of the locations of points $264_2$, $294_2$, $329_2$, $264_2$, $300_2$ and $324_2$ and point $340_3$ represents the average location of the locations of points $264_3$, $294_3$, $329_3$, $270_3$, $300_3$ and $324_3$.

These average locations define a feature reference location. Points $336_1$ and $336_2$ define the feature reference locations of eyes, point 338 define the reference location of a nose and points $340_1$, $340_1$ and $340_3$ define the reference locations of a mouth.

Once these key-point reference locations are determined, each object in each of the initial training samples is aligned with these key-point reference locations, such that the key-points of each object, align with the respective key-point reference location to a degree determined by optimizing selected alignment cost function (e.g., the squared error of the distances between the object key-points and the key-point reference locations). Thereafter, each of the training samples is perturbed from this reference location, thus creating new training samples. The perturbation includes at least one of a horizontal shift a vertical shift orientation shift of the object. The perturbation of each sample is determined randomly according to a selected probability distribution (e.g., Gaussian). Employing these perturbations, the number of training samples in the training set may be increased beyond the initial size thereof. This process is also referred to as 'training sample augmentation' and the training sample produced thereby are referred to as 'augmented training samples'. In the exemplary training set brought forth in FIGS. 5A-5H, each image includes training samples exhibiting two bounding box size. However, in general, a training sample exhibiting a bounding box of one size may be scaled to produce a training sample exhibiting a bounding box of a different size. This scaled bounding box is can then be employed as a training sample.

Figure 6:
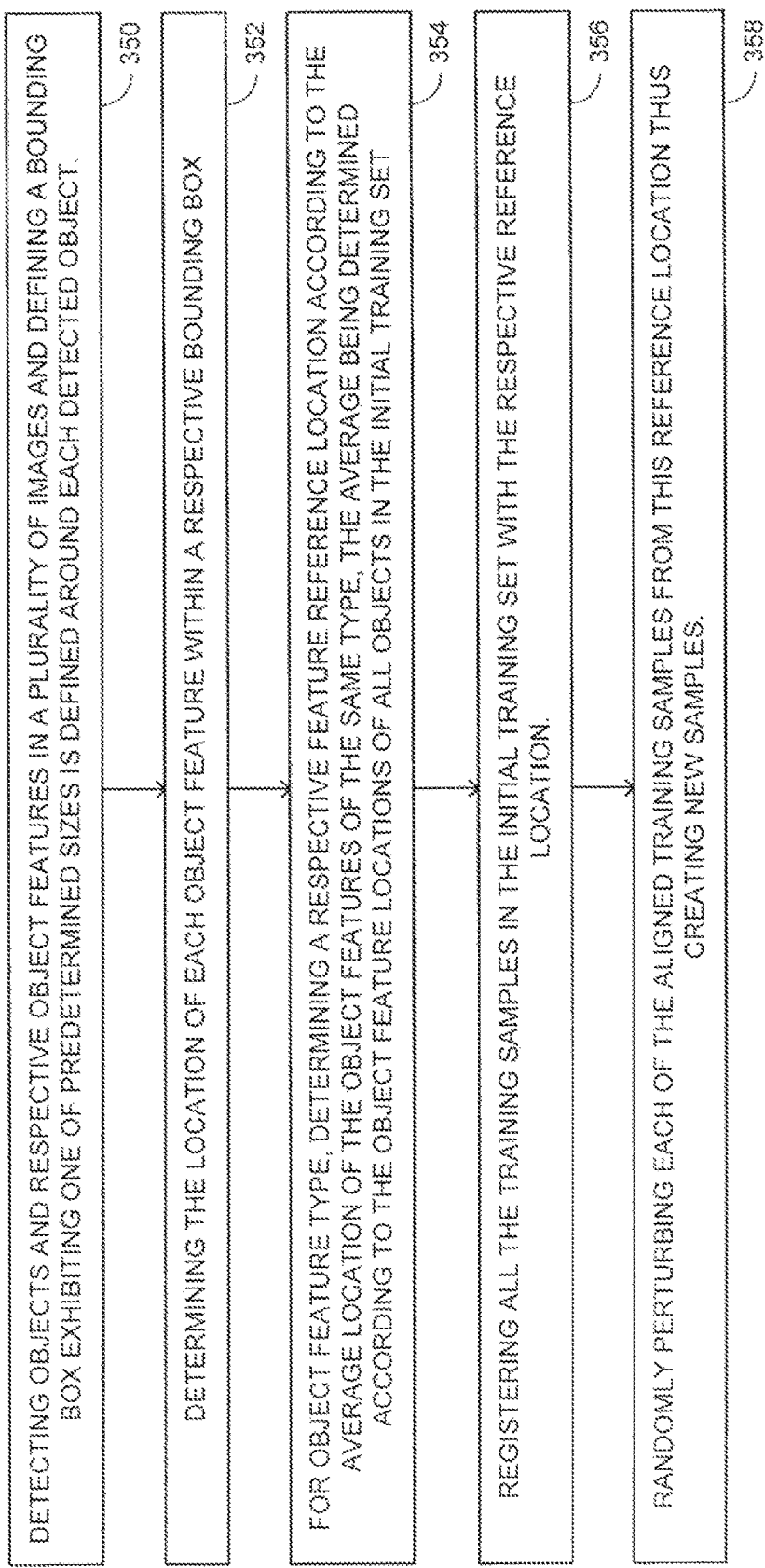
FIG. 6 is a schematic illustration of method of determining a training set for neural networks, operative in accordance with another embodiment of the disclosed technique.

Reference is now made to FIG. 6, which is a schematic illustration of method of determining a training set for neural networks, operative in accordance with another embodiment of the disclosed technique. In procedure 350 objects and respective object key-points are detected in a plurality of images of a training set and bounding boxes, exhibiting predetermined sizes, are defined around each detected object. The objects may be determined, for example, by a human observer (i.e., manually). The objects may also be determined by employing an automated detector or in a semi-automated manner (e.g., the objects are detected by an automatic detector and verified by a human observer).

In procedure 352, the location of each object key-point, within the bounding box, is determined. In procedure 354, for object key-point type, a respective key-point reference location is determined. The respective key-point reference location is determined according to the average location of the object key-points of the same type, the average being determined according to the object key-point locations of all objects in the initial training set.

In procedure 356, registering all the training samples in the initial training set with the respective reference location.

In procedure 358, perturbing randomly each of the aligned samples from the reference location, thus creating new samples.

Figure 7:
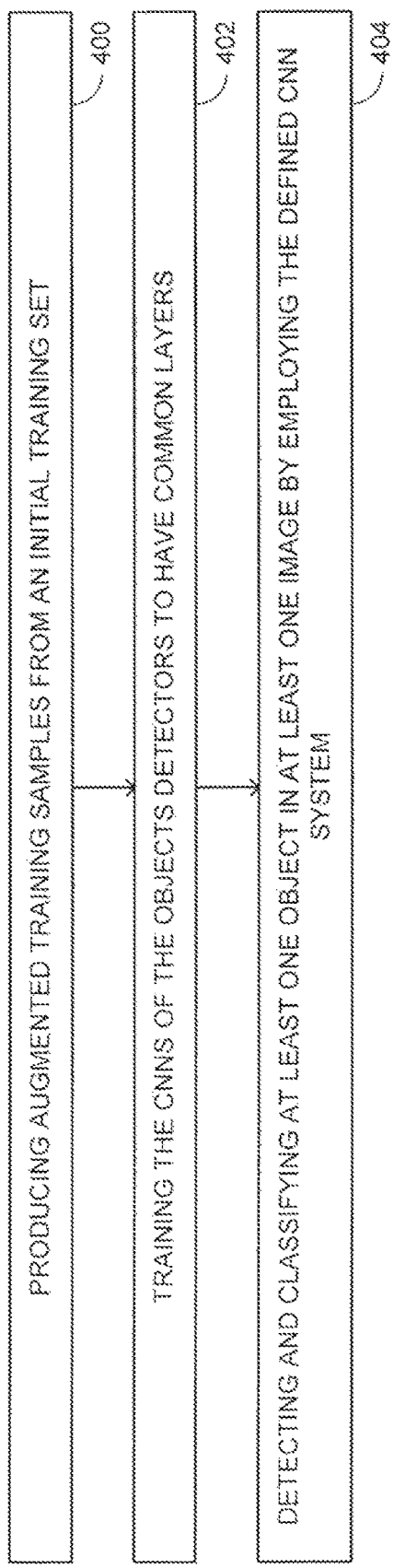
FIG. 7, is a schematic illustration of a method for CNNs, operative in accordance with a further embodiment of the disclosed technique.

Reference is now made to FIG. 7, which is a schematic illustration of a method for CNNs, operative in accordance with a further embodiment of the disclosed technique. In procedure 400 augmented training samples are produced from an initial training set. is described herein above in conjunction with FIGS. 5A-5H and 6.

In procedure 402, CNNs of the objects detectors are trained to have common layers. According to one alternative, the weights and parameters (or the corrections factors thereto), of all the groups of layers with identical characteristics of the object detectors are averaged to produce common layers. According to another alternative, a single training scale detector is trained and duplicates of the training scale detector are deployed, defining a CNN system. Each duplicate is associated with a respective scaled version of an input image, the duplicates of the training scale detector defining a CNN system.

In procedure 404 at least one object is detected and classified in at least one image by employing the defined CNN system. Detecting and classifying at least one object in at least one image includes the sub-procedures of:

down-sampling the image according to a plurality of down-sampling ratios, to produce a plurality of down-sampled images, each down-sampled image being associated with a respective down-sampling ratio;

for each down-sampled image, detecting by a corresponding CNN, objects at a predetermined image window size with respect to the image; and classifying objects in the image. CNNs which detect objects in respective down-sampled images and are associated with the same respective down-sampling ratio, define at least one group of CNNs. CNNs in a group of convolutional networks are associated with common convolution layers.

With reference to FIG. 4, as described above, the CNNs respective of object detectors $204_1$ and $206_2$ define a group of CNNs. Similarly, the CNNs respective of object detectors $204_2$ and $206_3$ define a group of CNNs.

It will be appreciated by persons skilled in the art that the disclosed technique is not limited to what has been particularly shown and described hereinabove. Rather the scope of the disclosed technique is defined only by the claims, which follow.

The invention claimed is:

1. A convolutional neural network system for detecting at least one object in at least one image, the system comprising:
a plurality of object detectors, each object detector corresponding to a predetermined image window size in said at least one image, each object detector being associated with a respective down sampling ratio with respect to said at least one image, each object detector including:
a respective convolutional neural network, said convolutional neural network including a plurality of convolution layers; and
an object classifier, coupled with said convolutional neural network, for classifying objects in said image according to the results from said convolutional neural network,
wherein, object detectors associated with a same respective down sampling ratio define at least one group of object detectors, object detectors in a group of object detectors being associated with common convolution layers,
wherein said object classifier is a convolution classifier, convolving at least one classification filter with a features map provided by said respective convolutional neural network
wherein said respective convolutional neural network producing the features map including a plurality of features, each entry represents the features intensities within an image window associated with said entry, said image window exhibiting said respective image window size
wherein said object classifier provides a classification vector which includes a probability that said object is located at each of the image windows associated with said features
wherein said classification vector further includes image window correction factors for each image window associated with said features map, said image window correction factors include corrections to a width and a height of each image window and corrections to a location of each image window and correction to an orientation of each image window.

2. A convolutional neural network method comprising the procedures of:
down sampling an image according to a plurality of down sampling ratios, to produce a plurality of down sampled images, each down sampled image being associated with a respective down sampling ratio;
for each down sampled image, detecting by a corresponding convolutional neural network, objects at a predetermined image window size with respect to at least one image; and
classifying objects in said image,
wherein convolutional neural networks, detecting objects in respective down sampled images associated with a same respective down sampling ratio, define at least one group of convolutional neural networks, convolutional neural networks in a group of convolutional neural networks being associated with common convolution layers,
further including, prior to said procedure of down-sampling said image, the procedures of:
producing augmented training samples from an initial training set; and
training the convolutional neural networks to have the common layers.

3. The convolutional neural network method according to claim 2, wherein training the convolutional neural networks to have common layers includes averaging weights and parameters, of all the groups of layers with identical characteristics of the object detectors.

4. The convolutional neural network method according to claim 2, wherein, training the convolutional neural networks to have common layers includes training a single training scale detector by employing said augmented training samples and deploying duplicates of said training scale detector, each duplicate being associated with a respective scaled version of said at least one image, the duplicates of the training scale detector defining a convolutional neural network system.

5. The convolutional neural network method according to claim 2, wherein said procedure of producing augmented training samples include the sub procedures of:
determining a location of each object key point within a respective training sample bounding box;
for object key point type, determining a respective key point reference location according to the average location of the object key points of a same type, the average being determined according to the object key point locations of all objects in the initial training set;
registering all the training samples in the initial training set with the features reference locations; and
randomly perturbing each of the aligned training samples from this reference location.

6. The convolutional neural network system according to claim 1, further including a plurality of down samplers each associated with a respective down sampling ratio, said down samplers being configured to produce said scaled versions of said image, each scaled version being associated with a respective down sampling ratio.

7. The convolutional neural network system according to claim 6, wherein down samplers, and object detectors associated with a same respective image window size with respect to said image, define a scale detector, each scale detector being associated with a respective scaled version of said image.

8. The convolutional neural network system according to claim 7, wherein, a single training scale detector is trained when the scale detectors exhibit a same configuration of object detectors, and when the convolutional neural networks in the object detectors exhibit groups layers with identical characteristics.

9. The convolutional neural network system according to claim 8, wherein prior to training said training scale detector a number of training samples in a training set is increased beyond the initial number of training samples by:
- determining a location of each object key point within a respective training sample bounding box;
- for object key point type, determining a respective feature reference location according to an average location of the object key points of a same type, the average being determined according to the object key point locations of all objects in an initial training set;
- registering all the training samples in the initial training set with the features reference locations; and randomly perturbing each of the aligned training samples from this reference location.

10. A convolutional neural network system for detecting at least one object in at least one image, the system comprising:
- a plurality of object detectors, each object detector corresponding to a predetermined image window size in said at least one image, each object detector being associated with a respective down sampling ratio with respect to said at least one image, each object detector including:
  - a respective convolutional neural network, said convolutional neural network including a plurality of convolution layers; and
  - an object classifier, coupled with said convolutional neural network, for classifying objects in said image according to the results from said convolutional neural network;
- a plurality of down samplers each associated with a respective down sampling ratio, said down samplers being configured to produce said scaled versions of said image, each scaled version being associated with a respective down sampling ratio, wherein, object detectors associated with a same respective down sampling ratio define at least one group of object detectors, object detectors in a group of object detectors being associated with common convolution layers, wherein down samplers, and object detectors associated with a same respective image window size with respect to said image, define a scale detector, each scale detector being associated with a respective scaled version of said image, and wherein, a single training scale detector is trained when the scale detectors exhibit a same configuration of object detectors, and when the convolutional neural networks in the object detectors exhibit groups layers with identical characteristics.

11. The convolutional neural network system according to claim 10, wherein said object classifier is a convolution classifier, convolving at least one classification filter with a features map provided by said respective convolutional neural network.

12. The convolutional neural network system according to claim 11, wherein said respective convolutional neural network producing a features map including a plurality of features, each entry represents the features intensities within an image window associated with said entry, said image window exhibiting said respective image window size.

13. The convolutional neural network system according to claim 12, where said object classifier provides a probability that said object is located at each of the image windows associated said features.

14. The convolutional neural network system according to claim 13, wherein said classification vector further including image window correction factors for each image window associated with said features map, said image window correction factors include corrections to a width and a height of each image window and corrections to a location of each image window and correction to an orientation of each image window.

15. The convolutional neural network system according to claim 14, wherein prior to training said training scale detector a number of training samples in a training set is increased beyond an initial number of training samples by:
- determining a location of each object key point within a respective training sample bounding box;
- for object key point type, determining a respective feature reference location according to an average location of the object key points of a same type, the average being determined according to the object key point locations of all objects in the initial training set;
- registering all the training samples in the initial training set with the features reference locations; and randomly perturbing each of the aligned training samples from this reference location.

* * * * *